United States Patent
Barros

(10) Patent No.: US 12,499,144 B2
(45) Date of Patent: Dec. 16, 2025

(54) LLM LATENCY REDUCTION VIA BRIDGING MULTIPLE LLMS OF DIFFERING SIZES

(71) Applicant: GOOGLE LLC, Mountain View, CA (US)

(72) Inventor: Brett Barros, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 91 days.

(21) Appl. No.: 18/532,426

(22) Filed: Dec. 7, 2023

(65) Prior Publication Data

US 2025/0190466 A1  Jun. 12, 2025

(51) Int. Cl.
| | |
|---|---|
| *G06F 16/334* | (2025.01) |
| *G06F 16/338* | (2019.01) |
| *G06F 40/289* | (2020.01) |
| *G06F 40/35* | (2020.01) |
| *G06N 3/0475* | (2023.01) |

(52) U.S. Cl.
CPC ........ *G06F 16/3344* (2019.01); *G06F 16/338* (2019.01); *G06F 40/289* (2020.01); *G06F 40/35* (2020.01); *G06N 3/0475* (2023.01)

(58) Field of Classification Search
CPC .. G06F 16/3344; G06F 16/338; G06F 40/289; G06F 40/35; G06F 16/33295; G06F 16/3325; G06N 3/0475
See application file for complete search history.

(56) References Cited

U.S. PATENT DOCUMENTS

| | | | |
|---|---|---|---|
| 2021/0279613 A1 | 9/2021 | Yu | |
| 2022/0189467 A1 | 6/2022 | Khalil et al. | |
| 2022/0335932 A1 | 10/2022 | Sharifi et al. | |
| 2023/0074406 A1 | 3/2023 | Baeuml | |
| 2024/0370658 A1* | 11/2024 | Zhang | ................... G06F 40/242 |

OTHER PUBLICATIONS

Deng et al, Rephrase and Respond: Let Large Language Models Ask Better Questions for Themselves, Nov. 7, 2023, https://arxiv.org/abs/2311.04205v1, 32 pages (Year: 2023).*
European Patent Office; International Search Report and Written Opinion issued in Application No. PCT/US2024/058944; 10 pages; dated Mar. 7, 2025.

(Continued)

*Primary Examiner* — Linda Wong
(74) *Attorney, Agent, or Firm* — Gray Ice Higdon

(57) ABSTRACT

Implementations utilize a smaller LLM to generate content responsive to a user query and cause a portion of the generated content to be rendered as an immediate response to the user query. Implementations further utilize a larger LLM to generate content that starts with the portion of the generated content and that includes a refined portion succeeding the portion of the generated content. The refined portion can be rendered succeeding the portion of the generated content. In some implementations, instead of using the smaller LLM, alternatively, the portion of the generated content rendered as the immediate response can be generated based on a default text string or a template, where the template can be determined/selected from a plurality of predefined templates based on a natural language understanding of the user query.

21 Claims, 7 Drawing Sheets

(56) References Cited

OTHER PUBLICATIONS

Joao Gante "Assisted Generation: a new direction toward low-latency text generation" Retrieved from https://huggingface.co/blog/assisted-generation. 14 pages, dated May 11, 2023.
Chen et al., "FrugalGPT: How to Use Large Language Models While Reducing Cost and Improving Performance" arXiv:2305.05176v1 [cs.LG] 13 pages, dated May 9, 2023.

* cited by examiner

LLM LATENCY REDUCTION VIA BRIDGING MULTIPLE LLMS OF DIFFERING SIZES

BACKGROUND

Various generative models have been proposed that can be used to process natural language (NL) content and/or other input(s), to generate output that reflects generative content that is responsive to the input(s). For example, large language models (LLM(s)) have been developed that can be used to process NL content and/or other input(s), to generate LLM output that reflects generative NL content and/or other generative content that is responsive to the input(s). For instance, an LLM can be used to process NL content of "how to change DNS settings on Acme router", to generate LLM output that reflects several responsive NL sentences such as: "First, type the router's IP address in a browser, the default IP address is 192.168.1.1. Then enter username and password, the defaults are admin and admin. Finally, select the advanced settings tab and find the DNS settings section". However, current utilizations of generative models suffer from one or more drawbacks.

As one example, many generative models can be of a very large size, often including billions of parameters (e.g., over 100 billion parameters, over 250 billion parameters, or over 500 billion parameters). Due to the large size of such a generative model, significant memory, processor, power, and/or other computational resource(s) can be required to process an input, using the generative model, to generate a corresponding generative output. This resource utilization can be significant on a per input basis, and very significant when hundreds or thousands of inputs are being processed per minute, per second, or other interval. Also, due to the large size of such a generative model, there can be significant latency in generating a corresponding generative output and, as a result, in rendering corresponding generative content. Such latency can lead to prolonging of a user-to-computer interaction. Further, due to the large size of such a generative model, many or all client devices may be unable to utilize such a generative model on-device. For example, memory constraints of a client device can prevent such a generative model from being loaded into memory.

Smaller size counterparts to such generative models do exist, such as a separately trained counterpart with less parameters or a pruned and/or quantized counterpart generated from applying one or more pruning techniques and/or one or more quantization techniques to the larger counterpart. For example, a smaller counterpart to a larger model can include 25%, 33%, 50%, 66% or other percentage less parameters than the larger model. However, such smaller size counterparts can be less robust and/or less accurate than their larger size counterparts. Accordingly, while utilizing such a smaller size counterpart to process an input can be more computationally efficient and/or can be performed with less latency, there is a greater risk that corresponding generative output, generated by processing the input, can be inaccurate and/or under-specified.

SUMMARY

Implementations disclosed herein are directed to utilizing a first generative model and a second generative model that have different computational efficiencies, to generate content to render responsive to a user utterance, a typed input, and/or other types of requests or query from a user (e.g., a human user). In various implementations, the first generative model can be more computationally efficient than the second generative model (e.g., by having fewer parameters). In some of those various implementations, the first generative model can be utilized on a client device, the second generative model can be utilized on remote server(s) that are remote from the client device, and the second generative model can be incapable of being utilized on the client device (i.e., due to computational constraint(s) of the client device). In some implementations, in response to receiving a user query, the first generative model can be utilized to process the user query to generate a first response that includes natural language (sometimes referred to as "first natural language response") and that is responsive to the user query.

In various implementations, the first response can include (e.g., start with) a first portion (e.g., sentence), such as one that makes no factual statement, and can include one or more additional portions that may make factual statement(s). For example, the user query can be a query seeking information for one or more entities, and the first generative model can be trained (e.g., fine-tuned) to determine/generate a first response that starts with one or more sentence(s) or other portion(s) that make no factual statement with respect to the one or more entities. In some implementations, one or more of the portion(s) can be processed using a text-to-speech (TTS) engine, to generate corresponding audio data. The generated audio data which corresponds to the portion(s) can be rendered to the user (e.g., audibly and immediately) in response to the user query.

In various implementations, the user query can also be provided to the second generative model, along with an instruction for the second generative model to generate a refined response that is responsive to the user query and that begins with (or that follows) the portion(s), from the first response, that are designated to be rendered. For example, a prompt can be generated to include the user request, the portion(s) from the first response, and/or the instruction for the second generative model to generate the refined response that is responsive to the user request and that begins with (or that follows) the portion(s) from the first response. The prompt can be provided to the second generative model, which can cause the prompt to be processed using the second generative model, to generate a second response (as the "refined response") responsive to the user query.

Depending on the specific content of the prompt for the second generative model, the second response can include, but does not necessarily need to include (e.g., begin with), the portion(s) from the first response. For example, when the instruction for the second generative model is to generate the refined response that begins with the portion(s), the second (or refined) response can begin with the portion(s) and can also include a refined portion having one or more additional sentences that follow the portion(s). As an additional example, when the instruction for the second generative mode is to generate a refined response that follows the portion(s), the refined response can include one or more sentences to follow the portion(s), but the refined response itself may include or begin with the portion(s). Put another way, in this additional example the refined response may not include the portion(s) from the first response.

By generating the prompt to include the portion(s), from the first response and that are designated to be rendered, the processing performed using the second generative model, in generating the refined response, is controlled. That is, by including the portion(s) in the prompt (optionally along with additional instruction(s) related to the portion(s)), the processing performed using the second generative model is controlled such that the refined response, generated by such processing, is coherent with the portion(s) that are designated to be rendered. This control can ensure that the latency and duration benefits that are achieved by immediately rendering the portion(s) are not negated by the refined response. For example, this can ensure that the refined response is not duplicative of the portion(s). Moreover, in implementations that generate a prompt that includes the portion(s) and that also include instructions to generate output that follows, but does not include, the portion(s), this can be further ensured.

In various implementations, processing the prompt using the second generative model can occur while the portion(s), from the first response from the first generative model, are being rendered to the user (e.g., while audio data for the first sentence is being audibly rendered to the user). For example, a model output of the second generative model, that is generated based on the prompt, can be generated prior to the audio data for the portion(s) being completely rendered. The model output of the second generative model that corresponds to the prompt can be used to determine the second response that begins with (or that is to follow) the portion(s), and the second response that begins with the portion(s) can be determined and/or transmitted to the TTS engine, prior to the first sentence being completely rendered. For instance, this can optionally be realized by controlling/reducing the rendering speed of the audio data that corresponds to the first sentence (when the first sentence is audibly rendered).

In various implementations, the second response can include a refined portion in natural language that succeeds the portion(s), where the refined portion can, but does not necessarily need to, provide factual statement(s). Subsequent to the audio data for the portion(s) (which is determined using the first generative model) being completely rendered, audio data for the refined portion (which is determined using the second generative model) can be rendered. For instance, the audio data for the refined portion can be rendered subsequent to the audio data for the portion(s), without any intervening audio data (e.g., audio data for any additional portion(s) determined using the first generative model).

It is noted that, in some implementations, the portion(s) determined using the first generative model can be rendered visually instead of or in addition to being rendered audibly, in response to the user query. Following the visual rendering of these portion(s), the refined portion can be rendered visually instead of or in addition to being rendered audibly. In these implementations, the user query can optionally be a typed or touch input. For example, in response to receiving input from a user via a user input device, a first sentence of the first response generated using the first generative model can be rendered visually at a user interface of a device that receives the user query, and the refined portion of the second response generated using the second generative model can be rendered visually at the user interface, for instance, 0.6 seconds (or other amount of time) after the first sentence is initially visually rendered. The first sentence of the first response can be rendered, optionally along with a representation of the input from the user. For example, both typed input and the first sentence can be rendered at the user interface, with the first sentence rendered as an immediate response to the typed input. The refined portion can be rendered visually and subsequent to the initial rendering of the first sentence, without any sentence(s) existing between the first sentence and the refined portion. Optionally, the first sentence may make no factual statement. For instance, the first sentence can be an opening sentence (e.g., "That is a really good question to ask what is AI"), greeting a user of the typed input, and/or can include non-factual information of a topic or entity in the typed input (e.g., "AI is a trending technology", "AI has been popular for several reasons"). Optionally, the refined portion can be rendered to provide more sophisticated and accurate content responsive to the typed input. For example, the refined portion can include one or more factual statements (e.g., year a concept or theory is introduced, a name of the author of the book or painting, a location where an event occurs, a size of a company, a total amount of time spent in building a structure, etc.) regarding one or more entities referenced in the typed input.

In various implementations, the first generative model can be a smaller large language model (LLM) having less than 100 billion parameters, while the second generative model can be a larger LLM that includes over 200 billion parameters. Due to the second generative model being the larger LLM, the refined portion can provide more accurate, sophisticated, and/or user-desired content responsive to the user query than any non-rendered portion of a response from the first generative model. Put another way, the second generative model can be objectively more robust and/or more accurate than the smaller LLM. Moreover, due to the first generative model being the smaller LLM, the first sentence can be rendered (e.g., audibly and/or visually) to the user with a reduced latency. This can be due to, for example, the smaller LLM including a lesser quantity of parameters and/or the smaller LLM being utilized on the client device (and being capable of being utilized on the client device). In other words, utilizing the first and second generative models that have different computational efficiencies to cooperatively render content responsive to the user query not only reduces latency in providing such content, but also improves accuracy and/or quality of the content itself. Moreover, by rendering the first sentence with reduced latency, the overall duration of the human to computer interaction can be reduced as the initial rendering is based on output from the lower-latency first generative model and can begin without waiting on the higher-latency second generative model. Accordingly, implementations seek to reduce the overall duration of the human to computer interaction by leveraging a lower-latency first generative model to render initial content more quickly, while also leveraging an objectively more robust and accurate second generative model to generate succeeding content to resolve the user request.

As a non-limiting working example, a user may provide a spoken utterance such as "why is my basement leaking?" or "Assistant, why is my basement leaking?", to a computing device. The spoken utterance can be parsed/recognized to determine a user query in natural language (i.e., "why is my basement leaking" in natural language). The user query in natural language can be provided to a first LLM (which is an example of the aforementioned first generative model) locally at the computing device, to be processed using the first LLM. For example, the user query in natural language can be processed using the first LLM local to the computing device, to generate a first model output, where a first response (responsive to user query) can be derived from the first model output.

The first response, for instance, includes a first sentence which makes no factual statement, and further includes a second portion (containing one or more sentences) in addition to the first sentence. The second portion can include, for instance, a second sentence following the first sentence, a third sentence following the second sentence, etc. The first sentence responsive to the spoken utterance of "Assistant, why is my basement leaking?" can be, for instance, "Sorry your basement is leaking". Optionally, the first sentence can include content (e.g., Oh no, I am so sorry . . . ) determined based on a tone (e.g., worried, excited, etc.) of the spoken utterance. Additionally or alternatively, audio data for the first sentence can have a tone determined based on a tone (e.g., worried, excited, etc.) of the spoken utterance. Optionally, the first sentence and/or the second sentence, can provide a summary, e.g., of the first response. As one example, the first sentence can be "Oh no you may want to check out the following common reasons for basement leakage". As another example, the first sentence can be "Oh no, I am so sorry your basement is leaking", and the second sentence can be "There are some common reasons for basement leakage".

Continuing with the non-limiting working example above, in some implementations, the user query can be provided to a second LLM (which is an example of the aforementioned second generative model) remote to the computing device, where the user query in natural language can be processed using the second LLM, to generate a second model output from which a second response is derived. The second LLM can be accessible via a server device that is in communication with the computing device. In some other implementations, instead of the user query, a text prompt can be provided to the second LLM, for the second LLM to generate the second model output. The text prompt can include, for instance, the user query in natural language, the first sentence, and a request/instruction to generate content that is responsive to the user query and that begins with the first sentence. It is noted that if the first sentence is already included/identified in the request to generate content responsive to the user query, the text prompt may not need to repeatedly include the first sentence. Put another way, the text prompt can include (1) the user query in natural language and (2) the request to generate content that is responsive to the user query and that begins with the first sentence, without separately or repeatedly including the first sentence from the first response.

As described above, the text prompt can be processed using the second LLM, to generate the second model output from which the second response is generated. The second response can begin with the first sentence (from the first response) and can continue with a refined portion following the first sentence. The first sentence can be processed using the TTS engine, and be rendered audibly in response to the spoken utterance that contains the user query. Immediately following rendering of the first sentence, the refined portion generated using the second LLM can be rendered audibly in lieu of the second portion generated using the first LLM, thereby improving accuracy or quality of the content rendered responsive to the user query.

In the above non-limiting working example, in some implementations, instead of the first sentence, a plurality of sentences or the predetermined number of sentences can be rendered audibly responsive to the user request, while the computing device awaits the refined portion to be generated using the second LLM at the server device. For instance, the refined portion can be received by the computing device (e.g., the TTS engine) prior to the audible rendering of the first sentence being complete. In this case, the TTS engine can audibly render the refined portion immediately once the audible rendering of the first sentence is complete.

In various implementations, the refined portion can be received by the TTS engine of the computing device subsequent to the completion of the audible rendering of the first sentence. In some implementations, the refined portion can be received by the TTS engine of the computing device within a predefined period of time (e.g., 0.5 seconds, etc.) of completion of the audible rendering of the first sentence. In those implementations, the TTS engine can audibly render the refined portion as soon as the refined portion (in natural language) is processed into its audible counterpart using the TTS engine. In some implementations, the refined portion may be received by the TTS engine of the computing device beyond a predefined period of time since the audible rendering of the first sentence is complete. In these implementations, the TTS engine can audibly render the second sentence from the first response when the predefined period of time reaches an end and then audibly render the refined portion immediately after the rendering of the second sentence.

In various implementations, the first LLM can be a smaller LLM, and the second LLM can be a larger LLM, where the smaller LLM is a quantized and/or pruned version of the larger LLM. In some other implementations, the smaller LLM is not a quantized and/or pruned version of the larger LLM but, instead, is wholly independent of the larger LLM. For example, the smaller LLM can have a different architecture relative to the larger LLM and/or can be trained on a unique set of training data relative to the larger LLM. For instance, the input dimensions of the smaller LLM can be smaller than those of the larger LLM, the output dimensions of the smaller LLM can be smaller than those of the larger LLM, and/or the smaller LLM can include various intermediate layers that vary in size and/or type relative to those of the larger LLM.

The smaller LLM can be more computationally efficient than the larger LLM. For example, processing a request utilizing the smaller LLM can occur with less latency than processing the request utilizing the larger LLM. As another example, processing the request utilizing the smaller LLM can utilize less memory, processor, and/or power resource(s) than processing the request utilizing the larger LLM. In some implementations, the smaller LLM can be on-device at the client device, and the larger LLM can be remote to the client device. For instance, the larger LLM can be at a server device that is in communication with the client device. Utilizing the smaller LLM (instead of the larger LLM) to generate the initial content and causing the generated initial content to be visually rendered responsive to the user request can more quickly satisfy informational needs of a user that provides the spoken utterance or the user request.

In some implementations, the user query/request can be processed to determine one or more query features, contextual feature(s), and/or attribute feature(s) associated with a client device and/or the user that provides the query/request. For example, when a user request includes a natural language query (e.g., automatically generated or generated based on user interface input), the one or more query features can include: term(s) of the query; an embedding of the term(s) of the query (e.g., generated using a separate encoder); topic(s) or domain(s) reflected by the query; and/or other feature(s) derivable from the query. As another example, when the user request includes a query with an image, the query feature(s) can include: an automatically generated caption of the image; descriptor(s) of object(s) automatically detected in the image; and/or other feature(s) derivable from the image. The contextual feature(s) can be or can include, for instance, a first feature relating to a tone of the user request (if the user request is an audible request) determined based on audio data capturing the user request. The attribute feature(s) can be determined, for instance, based on a user profile of the user.

In some implementations, the smaller or larger LLM is a sequence-to-sequence model, is transformer-based, and/or can include an encoder and/or a decoder. One non-limiting example of an LLM is GOOGLE'S Pathways Language Model (PaLM). Another non-limiting example of an LLM is GOOGLE'S Language Model for Dialogue Applications (LaMDA).

In some implementations, a method implemented using one or more processors is provided. The method includes receiving a user query in natural language. In response to receiving the user query, the method includes: processing the user query using a first generative model, to generate a natural language response that is responsive to the user query; causing a first portion of the natural language response to be audibly rendered; generating a text prompt to include the user query and include a natural language request to generate a refined natural language response that is responsive to the user query and that starts with the first portion of the natural language response; providing the generated text prompt to a second generative model, where providing the generated text prompt to a second generative model causes the generated text prompt to be processed using the second generative mode, to generate a refined natural language response that starts with the first portion and that includes a refined portion; and causing the refined portion of the refined natural language response to be audibly rendered after the first portion of the natural language response, without the second portion of the natural language response being rendered therebetween.

The preceding is presented as an overview of only some implementations disclosed herein. These and other implementations are disclosed in additional detail herein. For example, additional and/or alternative implementations are disclosed herein such as those directed to using a template to generate the first response, instead of utilizing the first generative model to generate the first response.

As another example, instead of processing the user query (which is determined from the user utterance) using the first LLM, a portion the user utterance that is determined to contain a user complete query can be processed using the first LLM, prior to or while an additional portion of the user utterance is still being processed (e.g., to determine a transcription of the user utterance in its entirety). The user utterance may be, for instance, "okay, how to cook a turkey?This is my first time cooking a turkey". In this case, a first portion of a transcription of the user utterance that corresponds to "how to cook a turkey" may be processed and determined to include a complete user query of "how to cook a turkey" in natural language. Prior to or while an additional portion of the transcription of the user utterance that corresponds to "This is my first time cooking a turkey" is being determined/generated, the first portion of the transcription ("okay, how to cook a turkey?) can be processed as input using the first LLM (e.g., a smaller LLM), to generate an immediate response to the user utterance. The immediate response can be rendered in response to the user utterance. Alternatively, instead of rendering the immediate response in its entirety, a portion of the immediate response, such as a first sentence of the immediate response, can be rendered in response to the user utterance.

In the above example, subsequent to the additional portion of transcription being determined, the transcription of the user utterance in its entirety ("okay, how to cook a turkey?This is my first time cooking a turkey") can be processed as input using the second LLM (e.g., a larger LLM), to generate a refined response. The refined response can include a refined portion that follows or is to follow the first sentence of the immediate response. The refined portion can be rendered immediately succeeding the first sentence of the immediate response. With respect to the immediate response, the refined portion may be more user-specific/desired (as specified in the user utterance—"This is my first time cooking a turkey") by including a recipe that is friendly to those who have little cooking experience or who have never cooked turkey before. By partially fulfilling the user intent that corresponds to performing the action of searching a recipe to cook a turkey (i.e., without determining/modifying the user intent based further on the user statement of "This is my first time cooking a turkey"), latency in rendering an immediate response (or a portion thereof) responsive to the user query of "how to cook a turkey" may be reduced. By further providing the refined portion of the refined response immediately following the immediate response, a more accurate response can be provided in response to the user utterance.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

DETAILED DESCRIPTION

Figure 1A:
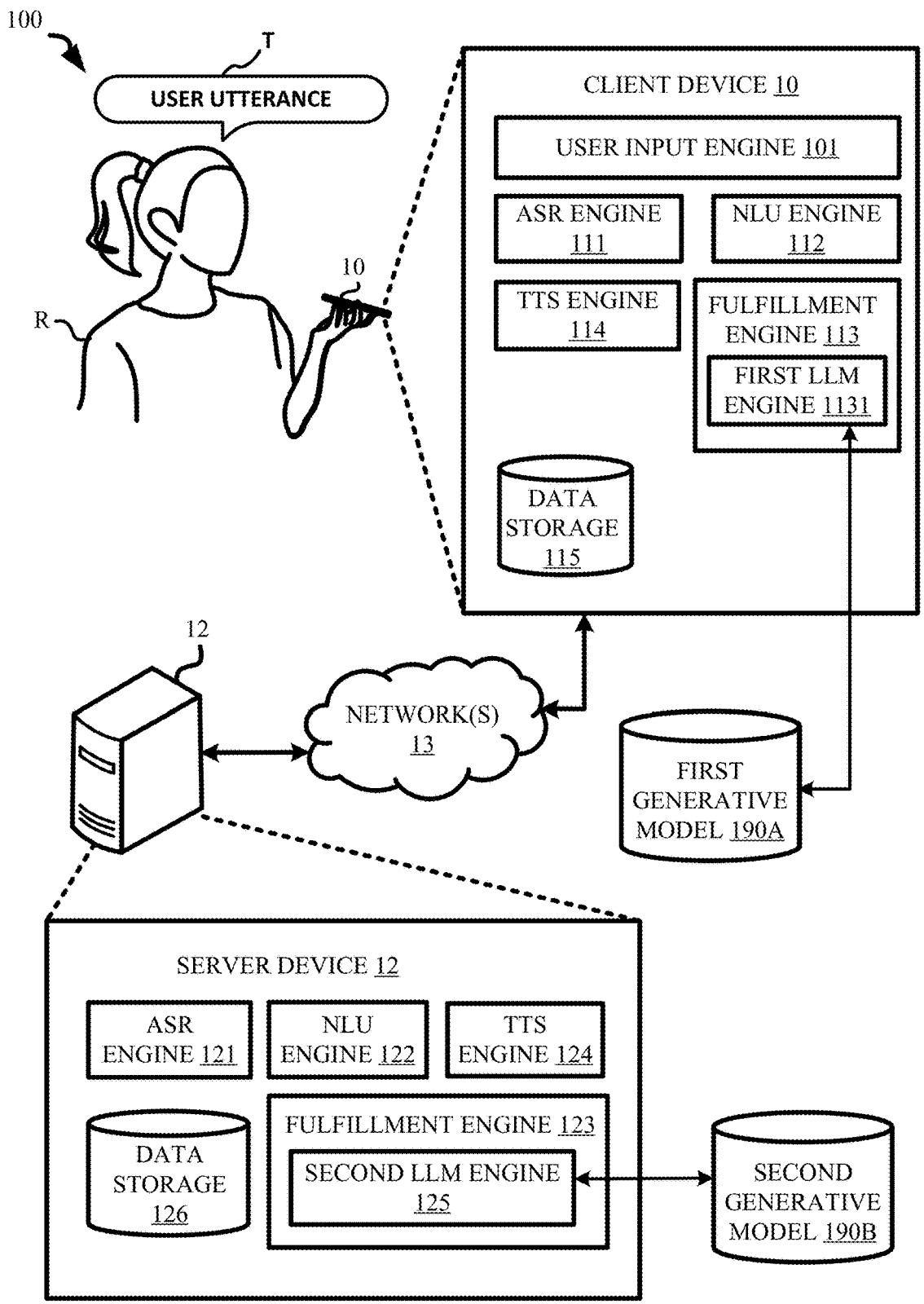
FIG. 1A depicts a block diagram of an example environment that demonstrates various aspects of the present disclosure, and in which some implementations disclosed herein can be implemented.

FIG. 1A is a block diagram of an example environment 100 that demonstrates various aspects of the present disclosure, and in which implementations disclosed herein may be implemented. As shown in FIG. 1A, the environment 100 can include a client computing device 10 ("client device"), and a server computing device 12 ("server device") in communication with the client computing device 10 via one or more networks 13. The one or more networks 15 can include, for example, a local area network (LAN), a wide area network (WAN) such as the Internet, and/or any other appropriate network.

The client computing device 10 can be, for example, a desktop computing device, a laptop computing device, a tablet computing device, a mobile phone computing device, a computing device of a vehicle (e.g., an in-vehicle entertainment system), an interactive speaker, a smart appliance such as a smart television, and/or a wearable apparatus that includes a computing device (e.g., glasses having a computing device, a virtual or augmented reality computing device), and the present disclosure is not limited thereto.

In various implementations, the client computing device 10 can include a user input engine 101 that is configured to detect user input provided by a user of the client computing device 10 using one or more user interface input devices. For example, the client computing device 10 can be equipped with one or more microphones that capture audio data, such as audio data corresponding to spoken utterances (e.g., user utterance T) of the user or other sounds in an environment of the client computing device 10. Additionally, or alternatively, the client computing device 10 can be equipped with one or more vision components that are configured to capture vision data corresponding to images and/or movements (e.g., gestures) detected in a field of view of one or more of the vision components.

Additionally, or alternatively, the client computing device 10 can be equipped with one or more touch sensitive components (e.g., a keyboard and mouse, a stylus, a touch screen, a touch panel, one or more hardware buttons, etc.) that are configured to capture signal(s) corresponding to touch input directed to the client computing device 10. Some instances of a query described herein, that can be included in a request, can be a query that is formulated based on user input provided by a user of the client computing device 10 and detected via user input engine 101. For example, the query can be a typed query that is typed via a physical or virtual keyboard, a suggested query that is selected via a touch screen or a mouse, a spoken voice query that is detected via microphone(s) of the client device, or an image query that is based on an image captured by a vision component of the client device.

In various implementations, the client computing device 10 can include a rendering engine 110, and/or a storage 115. In various implementations, the rendering engine 110 can be configured to provide content (e.g., a natural language based response generated by an LLM) for audible and/or visual presentation to a user of the client computing device 10 using one or more user interface output devices. For example, the client computing device 10 can be equipped with one or more speakers that enable content to be provided for audible presentation to the user via the client computing device 10. Additionally, or alternatively, the client computing device 10 can be equipped with a display or projector that enables content to be provided for visual presentation to the user via the client computing device 10.

In various implementations, the client computing device 10 can further include a plurality of local components. The plurality of local components can include an automatic speech recognition (ASR) engine 111, a natural language understanding (NLU) engine 112, a fulfillment engine 113, and/or a text-to-speech (TTS) engine 114. In some implementations, the ASR engine 111, the NLU engine 112, the fulfillment engine 113, and/or the TTS engine 114 may be included in an automated assistant (may also be known as "chatbot", "interactive assistant", etc.), where the automated assistant can be installed or accessed via the client computing device 10. In some implementations, a user R of the client computing device 10 may have a registered account associated with the automated assistant and/or other third-party application(s). The third-party application(s) can include, for example, a note-taking application, a shopping application, a messaging application, and/or any other appropriate applications (or services), installed at (or accessible via) the client computing device 10.

The server computing device 12 can be, for example, a web server, a proxy server, a VPN server, or any other type of server as needed. In various implementations, the server computing device 12 can include cloud-based components the same as or similar to the plurality of local components installed at the client computing device 1. For example, the server computing device 12 can include a cloud-based ASR engine 121, a cloud-based NLU engine 122, a cloud-based fulfillment engine 123, and/or a cloud-based TTS engine 124. The server computing device 12 can optionally include a data storage 126.

The ASR engine 111 (and/or the cloud-based ASR engine 121) can process, using one or more streaming ASR models (e.g., a recurrent neural network (RNN) model, a transformer model, and/or any other type of ML model capable of performing ASR), streams of audio data that capture spoken utterances and that are generated by microphone(s) of the client computing device 10 to generate corresponding streams of ASR output. Notably, the streaming ASR model can be utilized to generate the corresponding streams of ASR output as the streams of audio data are generated.

The NLU engine 112 and/or the cloud-based NLU engine 122 can process, using one or more NLU models (e.g., a long short-term memory (LSTM), gated recurrent unit (GRU), and/or any other type of RNN or other ML model capable of performing NLU) and/or grammar-based rule(s), the corresponding streams of ASR output to generate corresponding streams of NLU output. The fulfillment engine 113 and/or the cloud-based fulfillment engine 123 can cause the corresponding streams of NLU output to be processed to generate corresponding streams of fulfillment data. The corresponding streams of fulfillment data can correspond to, for example, corresponding given assistant outputs that are predicted to be responsive to spoken utterances captured in the corresponding streams of audio data processed by the ASR engine 111 (and/or the cloud-based ASR engine 121).

The TTS engine (e.g., 114 and/or 124) can process, using TTS model(s), corresponding streams of textual content (e.g., text formulated by the LLM-based assistant 11) to generate synthesized speech audio data that includes computer-generated synthesized speech. The corresponding streams of textual content can correspond to, for example, one or more given assistant outputs, one or more of modified given assistant outputs, and/or any other textual content described herein. The aforementioned ML model(s) can be on-device ML models that are stored locally at the client computing device 10, remote ML models that are executed remotely from the server computing device (e.g., at remote server device 12), or shared ML models that are accessible to both the client computing device 10 and/or remote systems (e.g., the remote server computing device 12). In additional or alternatively implementations, corresponding streams of synthesized speech audio data corresponding to the one or more given assistant outputs, the one or more of modified given assistant outputs, and/or any other textual content described herein can be pre-cached in memory or one or more databases accessible by the client computing device 10, such that the LLM-based assistant need not use the TTS engine 114 (or 124) to generate the corresponding synthesized speech audio data.

In various implementations, the corresponding streams of ASR output can include, for example, streams of ASR hypotheses (e.g., term hypotheses and/or transcription hypotheses) that are predicted to correspond to spoken utterance(s) of a user that are captured in the corresponding streams of audio data, one or more corresponding predicted measures (e.g., probabilities, log likelihoods, and/or other values) for each of the ASR hypotheses included in the streams of ASR hypotheses, a plurality of phonemes that are predicted to correspond to spoken utterance(s) of a user that are captured in the corresponding streams of audio data, and/or other ASR output. In some versions of those implementations, the ASR engine 111 and/or 121 can select one or more of the ASR hypotheses as corresponding recognized text that corresponds to the spoken utterance(s) (e.g., selected based on the corresponding predicted measures).

In various implementations, the corresponding streams of NLU output can include, for example, streams of annotated recognized text that includes one or more annotations of the recognized text for one or more (e.g., all) of the terms of the recognized text, one or more corresponding predicted measures (e.g., probabilities, log likelihoods, and/or other values) for NLU output included in the streams of NLU output, and/or other NLU output. For example, the NLU engine 112 and/or 122 may include a part of speech tagger (not depicted) configured to annotate terms with their grammatical roles. Additionally, or alternatively, the NLU engine 112 and/or 122 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the NLU engine 112 and/or 122 may include a coreference resolver (not depicted) configured to group, or "cluster," references to the same entity based on one or more contextual cues. For example, the coreference resolver may be utilized to resolve the term "them" to "buy theater tickets" in the natural language input "buy them", based on "theater tickets" being mentioned in a client device notification rendered immediately prior to receiving input "buy them". In some implementations, one or more components of the NLU engine 112 and/or 122 may rely on annotations from one or more other components of the NLU engine 112 and/or 122. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

Additionally, or alternatively, the NLU engine 112 and/or 122 can include a query determination engine configured to determine, based on the corresponding streams of NLU output, whether a speech recognition of a spoken utterance T (e.g., from user R) includes a user query. In some implementations, the fulfillment engine 113 can include a first LLM engine 1131 and/or a second LLM engine 125. Alternatively, the second LLM engine 125 can be at the server device 12, instead of being at the client computing device 10. The first LLM engine 1131 can be in communication with a first generative model 190A (e.g., a first LLM), and the second LLM engine 1132 can be in communication with a second generative model 190B (e.g., a second LLM). In some implementations, the client computing device 11 or the server device 12 can include a prompt-generating engine 116 (see FIG. 1B), configured to generate a prompt to be processed as input using the first generative model 190A or the second generative model 190B. In response to the query determination engine determining that a speech recognition of a spoken utterance (e.g., from user R) includes a user query, the prompt-generating engine 116 can generate first text (also referred to as "first prompt") based on the user query (e.g., determined from the speech recognition of the user utterance).

The first text can be, or can include, the user query, where the first text can be processed as input, using the first generative model 190A, to generate first model output ("first output") from which a first response is determined. The first response can include a first portion and a second portion, where the first portion can include one or more sentences making no factual statement. The first portion of the first response can be processed using the TTS engine 114, to generate first audio data for the first portion of the first response. The first audio data can be audibly rendered as an immediate response to the user query.

In some implementations, in response to the first portion being decoded/determined from the first output of the first generative model that corresponds to the user query, the prompt-generating engine 116 can generate second text ("second prompt", "second textual prompt") based on the user query (determined from the speech recognition of the user utterance) and/or based on the first portion of the first response generated using the first generative model 190A. For instance, the prompt-generating engine 116 can generate the second text to include the user query and an instruction to generate a response that starts with the first portion of the first response. The second text can be processed as input, using the second generative model 190B, to generate second model output ("second output") from which a second response is determined. The second response can include the first portion and a refined portion following the first portion. The refined portion can be processed using the TTS 114, to generate second audio data that includes the refined portion, where the second audio data can be rendered audibly to provide a refined response to the user query, succeeding the aforementioned first audio data. In some implementations, a speed for rendering the first audio data can be configured so that a latency between the first audio data and the second audio data is minimized or reduced. For example, the second audio data can be audibly rendered within a predetermined period of time subsequent to rendering of the first audio data.

In various implementations, the first generative model can be a smaller large language model (LLM) having less than 100 billion parameters, while the second generative model can be a larger LLM that includes over 200 billion parameters. Due to the second generative model being the larger LLM, the refined portion may provide more accurate or sophisticated content responsive to the user request than the second portion. Due to the first generative model being the smaller LLM, the first portion can be rendered audibly to the user with reduced latency. In other words, utilizing the first and second generative models that have different computational efficiencies to cooperatively and selectively render content (e.g., the first portion and the refined portion) responsive to the user request not only reduces latency in providing content responsive to the user query, but also improves accuracy or quality of the content responsive to the user query.

In various implementations, the first LLM can be a smaller LLM, and the second LLM can be a larger LLM, where the smaller LLM is a quantized and/or pruned version of the larger LLM. In some other implementations, the smaller LLM is not a quantized and/or pruned version of the larger LLM but, instead, is wholly independent of the larger LLM. For example, the smaller LLM can have a different architecture relative to the larger LLM and/or can be trained on a unique set of training data relative to the larger LLM. For instance, the first LLM can be trained to make no factual statement for the first few sentences of the first response, while the second LLM can be trained to make factual statement(s) for a first sentence of the refined portion. Optionally, the input dimensions of the smaller LLM can be smaller than those of the larger LLM, the output dimensions of the smaller LLM can be smaller than those of the larger LLM, and/or the smaller LLM can include various intermediate layers that vary in size and/or type relative to those of the larger LLM.

The smaller LLM can be more computationally efficient than the larger LLM. For example, processing a request utilizing the smaller LLM can occur with less latency than processing the request utilizing the larger LLM. As another example, processing the request utilizing the smaller LLM can utilize less memory, processor, and/or power resource(s) than processing the request utilizing the larger LLM. In some implementations, the smaller LLM can be on-device at the client device, and the larger LLM can be remote to the client device. For instance, the larger LLM can be at a server device that is in communication with the client device. This however is not required. For example, both the smaller and larger LLMs can be local/on-device at the client device, or both the smaller and larger LLMs can be remote to the client device. Utilizing the smaller LLM (instead of the larger LLM) to generate the initial content and causing the generated initial content to be visually rendered responsive to the user request can more quickly satisfy informational needs of a user that provides the spoken utterance or the user request.

Figure 1B:
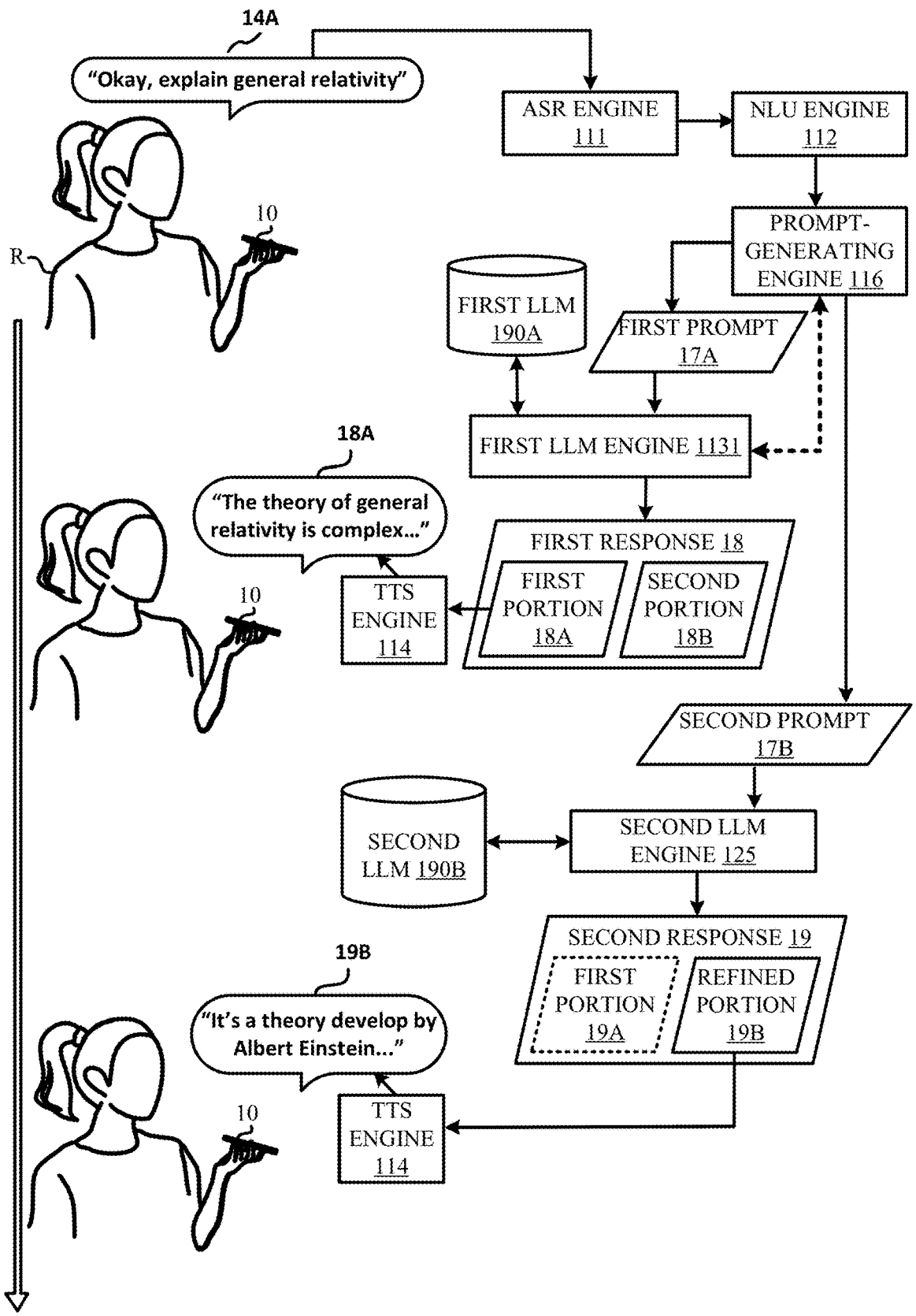
FIG. 1B illustrates an example of rendering a response that demonstrates various aspects of the present disclosure, and in which some implementations disclosed herein can be implemented.

FIG. 1B illustrates a non-limiting example of rendering a response that demonstrates various aspects of the present disclosure, and in which some implementations disclosed herein can be implemented. As shown in FIG. 1B, user R can provide a user utterance 14A, such as "Okay, explain general relativity", to a client device 10. In this example, the user utterance 14A can be processed using the ASR engine 111 (and/or 121) to determine a speech recognition of the user utterance 14A. In some implementations, the speech recognition of the user utterance 14A can be processed to determine a user query for "general relativity". In some other implementations, the speech recognition of the user utterance 14A can be processed using the NLU engine 112 (and/or 122) to determine a user intent (e.g., explain) and/or parameter(s) associated with the user intent (e.g., "general relativity"), for an action (e.g., explain general relativity). The user intent and/or the parameter(s) associated with the user intent, or the user query, can be received by the fulfillment engine 113 (and/or 123).

In some implementations, the fulfillment engine 113 (which is local to the client device 10) can include, or can be in communication with, a first LLM engine 113I and a second LLM engine 125. In some other implementations, the fulfillment engine 123 (remote to the client device 10) can include, or can be in communication with, the first LLM engine 113I and the second LLM engine 125. In some other implementations, the fulfillment engine 113 (local to the client device 10) can include (or can be in communication with) the first LLM engine 113I, and the fulfillment engine 123 (remote to the client device 10) can include (or can be in communication with) the second LLM engine 125. For instance, in response to receiving the user query for "general relativity", the fulfillment engine 113 (and/or 123) can initiate a prompt-engineering engine 116 (which can be included in the fulfillment engine 113/123, or can be in communication with the fulfillment engine 113/123) to generate a first textual prompt 17A (also referred to as "first text" or "first prompt"). The prompt-engineering engine 116 can, for instance, generate the first textual prompt 17A to include the user query for "general relativity". The first textual prompt 17A, for instance, is to be processed as input using the first LLM 190A.

In some implementations, the prompt-engineering engine 116 may generate a second textual prompt 17B (also referred to as "second text" or "second prompt"), where the second textual prompt 17B can be processed using the second LLM 190B. The second textual prompt 17B may be the same as, or different from, the first textual prompt 17A. For example, given the user utterance 14A of "okay, please explain general relativity", the first textual prompt 17A and the second textual prompt 17B can be both, e.g., "describe general relativity" or "describe the concept of general relativity". In this example, processing of the first textual prompt 17A using the first LLM 190A can be in parallel with processing of the second textual prompt 17B using the second LLM 190B.

It is noted that, even when the first textual prompt 17A and the second textual prompt 17B are the same or similar, output of the first LLM 190A (generated based on processing the first textual prompt 17A) can be different from output of the second LLM 190B (which is generated based on processing the second textual prompt 17B). This is because the first LLM 190A and the second LLM 190B can be of different types, can have different numbers of parameters, and/or can be trained differently (e.g., using different training datasets). For instance, in some implementations, as described above, the first LLM 190A may be a distilled, quantized and/or pruned version of the second LLM 190B.

In some other implementations, the second LLM 190B can be trained based on a plurality of training instances to predict a first sentence (or the first couple of sentences) of a response generated/determined from output of the first LLM 190A, or the second LLM 190B can be fine-tuned based on the plurality of training instances to predict the first sentence (or the first couple of sentences) of the response generated/determined from output of the first LLM 190A. In these implementations, the plurality of training instances can each include a training instance input and a ground truth response. The training instance input can include (and sometimes only include) a user query (e.g., "explain general relativity" in natural language), and the ground truth response that corresponds to the training instance input can include (and sometimes only include) a natural language response (e.g., the refined portion 19B in FIG. 1B or 1C) that is to follow a first sentence (e.g., the first portion 19A in FIG. 1B or 1C) of a response generated based on processing the user query using the trained first LLM 190A (or a template). Put another way, the ground truth response can exclude the first sentence of the response that is generated based on processing the user query using the trained first LLM 190A (or a template).

For instance, the first LLM 190A can be trained to make no factual statement for the first sentence (or the first two sentences, or any other applicable number of sentences in the very beginning of a first response 18 that is responsive to the user utterance 14A). This is realized, for instance, by training the first LLM 190A using (and sometimes only using) training instances each having training instance input that includes a user query and a ground truth response that makes no factual statement for the first sentence (or any other applicable number of sentences that the response to the user utterance starts with). Additionally or alternatively, the first LLM 190 A can be trained to provide the first sentence (or the first few sentences) of the first response 18, in a way that the first sentence (or the first few sentences) includes particular content (e.g., "Oh well, that is a complex subject", etc.). Additionally or alternatively, the first LLM 190 A can be trained to provide the first sentence (or the first few sentences) of the first response 18, in a way that the first sentence (or the first few sentences) is of a particular length or is within a particular range of length (e.g., 20-word, 30-word, or between 20-50 words, etc.).

Descriptions of the training of the first LLM 190A are, however, not limited thereto. For instance, the first LLM 190A can be trained to provide a first response 18 that is of a particular total length (e.g., 80 words, 100 words, etc., which does not exceed a predefined length threshold), in response to the user utterance 14A. By training the first LLM 190A to provide the first portion 18A of the first response 18 of the particular length and/or by training the first LLM 190A to provide the first response 18 of the particular total length that does not exceed the predefined length threshold, an efficiency of using the first LLM 190A in providing the first portion 18A immediately responsive to the user utterance 14A can be ensured or improved. For instance, in response to determining that the first portion 18 is decoded from a first model output of the first LLM 190A based on processing the first textual prompt 17A, the first portion 18A of the first response 18 can be processed using the TTS engine 114 to generate first audio data that corresponds to the first portion 18A. In this case, the first audio data can be rendered to user R as an immediate response to the user utterance 14A, while the client device 10 (or another device) awaits a refined response 19B from the second LLM 190B that is of higher quality (e.g., better accuracy).

The second LLM 190B can, for instance, be trained to make a factual statement starting from the first sentence or the second sentence (or another applicable sentence). The second LLM 190B can be trained using a second training dataset which is larger than a first training dataset that is used for training the first LLM 190A. The second training dataset for training the second LLM 190B can include different training instances than training instances in the first training dataset. For example, the training instances in the second training dataset (or a portion thereof) can each include (1) a training instance input containing a user query and (2) a ground truth response that is responsive to the user query and that makes a factual statement starting from a certain sentence (e.g., the first sentence or second sentence). In this example, the training instances in the first training dataset (or a portion thereof) can each include a training instance input containing a user query and a ground truth response that is responsive to the user query and that makes no factual statement in the first sentence of the ground truth response (or in the first couple of sentences of the ground truth response). The second LLM 190B can be trained to provide the second response 19 that is of an approximately total length, e.g., a 200-word, 250-word, etc.

It is noted that the prompt-generating engine 116 can generate both the first and second textual prompts in response to receiving the speech recognition of the user utterance 14A (and/or the user query). In some other implementations, however, the prompt-generating engine 116 may wait to generate the second textual prompt 17B based on partial or complete output of the first LLM 190A, where the partial or complete output is generated based on processing the speech recognition of the user utterance 14A (or the user query determined from the speech recognition).

In some implementations, the prompt-generating engine 116 may be configured to receive the first sentence (or the first portion 18A) of the first response 18 once the first sentence or the first portion 18A is decoded from the first output of the first LLM 190A. In these implementations, the prompt-generating engine 116 can generate the second textual prompt 17B based on the user query and/or based on the first portion 18A (which can include the first sentence, or the first few sentences, of the first response 18). As a practical example, given that the user utterance 14A is "okay, explain general relativity" and that the first portion 18A of the first response 18 is a single sentence of "The theory of general relatively is complex", the second textual prompt 17B can be in a format of "explain general relativity starting with the sentence of 'The theory of general relativity is complex'" or "explain general relativity to follow the sentence of 'The theory of general relativity is complex'". In this example, the second textual prompt 17B can, optionally, further include a word limit, and can be, for instance, "explain general relativity in about 225 words, starting with the sentence of 'The theory of general relativity is complex'", etc.

In response to the prompt-generating engine 116 generating the second textual prompt 17B, the second textual prompt 17B can be transmitted to a device that hosts the second LLM 190B. For example, if the second LLM 190B is at the client device 10, the second textual prompt 17B can be forwarded to the second LLM 190B, to be processed as input using the second LLM 190B. If the second LLM 190B is at a server remote to the client device 10, the second textual prompt 17B can be forwarded to the server, to be processed as input using the second LLM 190B.

In the above practical example, as shown in FIG. 1B, the second textual prompt 17B can be processed using the second LLM 190B to generate a second model output from which the second response 19 is determined. The second response 19 is responsive to the user utterance 14A, and can include a first portion 19A and a refined portion 19B, where the first portion 19A of the second response 19 can be the same as the first portion 18A of the first response 18 (e.g., when the second prompt includes the instruction to begin a response with the first portion 18A). The refined portion 19B can be processed using the TTS engine 114 to generate second audio data that corresponds to the refined portion 19B. In this practical example, in response to determining that the first audio data that corresponds to the first portion 18A of the first response 18 has been rendered via the client device, rendering of the second audio data that corresponds to the refined portion 19B of the second response 19 can be initiated. For instance, as shown in FIG. 1B, the refined portion 19B can make a factual statement such as "It's a theory developed by Albert Einstein", or "It's a theory developed by Albert Einstein in about 1915", etc.

It is noted that, while the second response 19 in FIG. 1B is illustrated as including both the first portion 19A and the refined portion 19B, in some other implementations, the first portion 19A may not be included in the second response. For example, when the second prompt includes an instruction to generate content (or a refined response) that follows, but does not include, the first portion 18A, the second response 19 generated using the second LLM 190B can include the refined portion 19B, without including the first portion 19A.

Figure 1C:
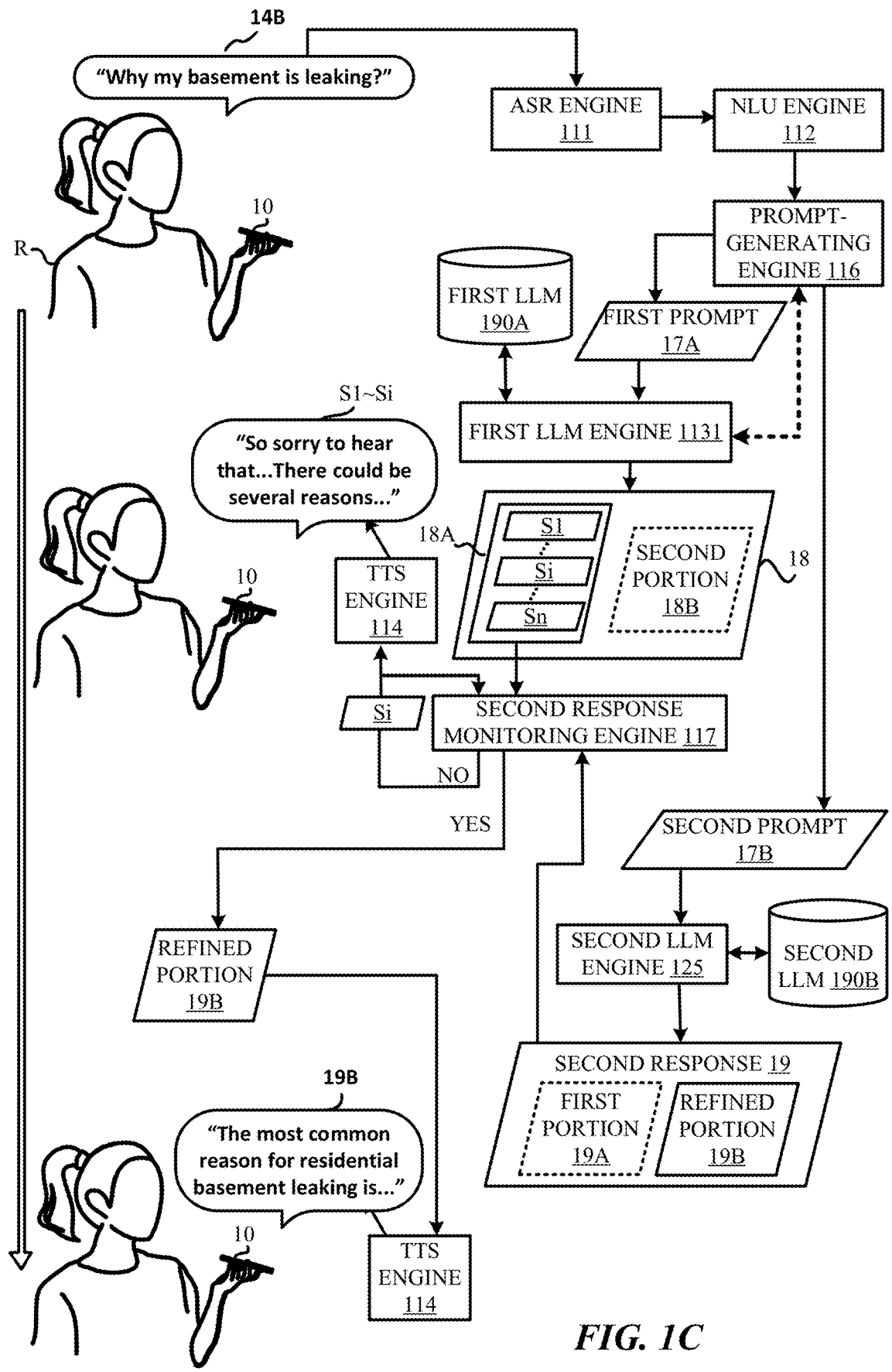
FIG. 1C illustrates another example of rendering a response that demonstrates various aspects of the present disclosure, and in which some implementations disclosed herein can be implemented.

FIG. 1C illustrates another non-limiting example of rendering a response that demonstrates various aspects of the present disclosure, and in which some implementations disclosed herein can be implemented. As shown in FIG. 1C, user R can provide a user utterance 14B, such as "Why is my basement leaking?" to a client device 10 (e.g., a smart phone). The user utterance 14B can be processed by the ASR engine 111 (and/or 121) to determine a speech recognition of the user utterance 14B. The speech recognition of the utterance 14B can be processed to determine a user query (e.g., a user query for reasons that causes basement leaking). In response to receiving the determined user query, the prompt-generating engine 116 can be initiated to determine a first prompt 17A and/or a second prompt 17B based on the determined user query.

In some implementations, the first prompt 17A and the second prompt 17B can be determined approximately at the same time. The second prompt 17B can be the same as the first prompt 17A, or can be different from the first prompt 17A. For instance, given "Why my basement is leaking" as a non-limiting particular example of the user utterance 14B, the first prompt 17A can be, or can include, the speech recognition of the user utterance "Why my basement is leaking?" or text such as "Generate a response for 'Why my basement is leaking' and limit the first sentence of the response to 20 words". In this particular example, the second prompt 17B can be or can include, for instance, the speech recognition of the user utterance "Why is my basement leaking?" or text such as "Generate a response with about 260 words for a query of 'Why my basement is leaking'".

In some other implementations, the second prompt 17B can be determined subsequent to the first prompt 17A. For example, the first prompt 17A can be processed as input using the first LLM 190A, to generate a first model output from which a first response 18 (that includes a first portion 18A) is determined. The second prompt 17B can depend on the first model output (or a portion thereof). For instance, the second prompt 17B can include an instruction to generate a response for the user utterance 14B that starts with the first portion 18A of the first response 18. In some implementations, the first portion 18A can be a single sentence S1. In some other implementations, the first portion 18A can include a plurality of sentences S1, . . . , Si, . . . , Sn ("n" being a positive integer greater than 1, and 1≤i≤n). Given the particular example above, if the first portion 18A of the first response 18 includes a single sentence of "So sorry to hear that", the second prompt 17B can be, for instance, "Generate a response for 'Why my basement is leaking' starting with the content of 'so sorry to hear that'". Continuing with this particular example, if the first portion 18A of the first response 18 includes a first sentence of "So sorry to hear that" and a second sentence of "There could be several reasons", the second prompt 17B can be, for instance, "Generate a response for 'Why my basement is leaking' starting with the content of 'So sorry to hear that. There could be several reasons.'"

In some implementations, the first LLM 190A can be trained to provide the first portion 18A that makes no factual statement (e.g., with respect to one or more entities in the speech recognition of the user utterance 14B). In some implementations, optionally, the first response 18 can further include a second portion 18B (e.g., that succeeds the first portion 18A). The first LLM 190A can be trained to generate the second portion 18B that makes at least one factual statement for the one or more entities in the speech recognition of the user utterance 14B. For instance, the second portion 18B can start with a sentence that makes a factual statement for an entity or event in the speech recognition of the user utterance 14B.

In some implementations, in response to the first portion 18A being determined (e.g., based on processing or decoding of the first model output of the first LLM 190A), the first portion 18A can be provided to a second response monitoring engine 117 which monitors for a presence of the second response 19 (or in some cases, a refined portion 19B of the second response 19 instead of the second response 19) that is generated based on the second prompt 17B using the second LLM 190B. The second portion 18B of the first response 18 may be provided to the second response monitoring engine 117, but this may not be required or needed.

In some implementations, the first sentence S1 may be provided directly to the TTS engine 114 immediately in response to the first sentence S1 being determined (or in response to the first portion 18A being determined, or in response to the first response 18 being determined). In some other implementations, the first sentence S1 may be provided by the second response monitoring engine 117 to the TTS engine 114. The first sentence S1 is processed using the TTS engine 114 to generate audio data for the first sentence S1. The audio data for the first sentence S1 can be audibly rendered to user R as an immediate response to the user utterance 14B. It is noted that, the first sentence S1 may also be rendered visually to the user immediately in response to the first sentence S1 being determined, when audible rendering is not desired (e.g., based on a silent mode of the computing device 10, or due to other situations).

In some implementations, while the audio data for the first sentence S1 is being rendered, the second response monitoring engine 117 can monitor for the second response 19 (or the refined portion 19B of the second response 19, in the case where the second prompt 17B includes an instruction for the second LLM 190B to generate the second response 19 that starts with the first portion 18A of the first response 18, so that the repeated first portion 18A does not need to be transmitted back to the second response monitoring engine 117), to determine whether the second response 19 is received. In some implementations, in response to determining that the second response 19 (or the refined portion 19B of the second response 19) is received prior to the audio data for the first sentence S1 being completely rendered and based on the second prompt 17B not including the instruction to generate the second response 19 that starts with the first portion 18A (so that the first portion 19A of the second response 19 is different from the first portion 18A of the first response 18), the second response monitoring engine 117 can provide the second response 19 to the TTS engine 114, to generate audio data for the second response 19. The audio data for the second response 19 can be rendered subsequent to the rendering of the audio data for the first sentence S1, e.g., without any intervening audio data being rendered between the audio data for the second response 19 and the audio data for the first sentence S1.

In some implementations, in response to determining that the second response 19 (or the refined portion 19B of the second response 19) is received prior to the audio data for the first sentence S1 being completely rendered and based on the second prompt 17B including the instruction to generate the second response 19 that starts with the first portion 18A (so that the first portion 19A of the second response 19 is the same as the first portion 18A of the first response 18), the second response monitoring engine 117 can provide the refined portion 19B of the second response 19 to the TTS engine 114, without providing the first portion 19A. The refined portion 19B can be processed using the TTS engine 114 to generate audio data for the refined portion 19B, where the audio data for the refined portion 19B can be rendered subsequent to the audio data for the first sentence S1. For instance, the audio data for the refined portion 19B can be rendered subsequent to the audio data for the first sentence S1, without any intervening audio data being rendered between the audio data for the refined portion 19B and the audio data for the first sentence S1.

In some implementations, in response to determining that the second response 19 (or the refined portion 19B of the second response 19) is received within a predefined period time (e.g., 0.5 second) since the audio data for the first sentence S1 is completely rendered, the second response monitoring engine 117 can provide the second response 19 (or the refined portion 19B) to the TTS engine 114, to generate corresponding audio data to be rendered following the audio data for the first sentence S1. The corresponding audio data for the second response 19 (or the refined portion 19B) can be rendered subsequent to the audio data for the first sentence S1, without any intervening audio data being rendered between the audio data for the second response 19 (or the refined portion 19B) and the audio data for the first sentence S1.

In some implementations, in response to determining that the second response 19 (or the refined portion 19B of the second response 19) is received beyond the aforementioned predefined period of time, the second response monitoring engine 117 can provide a second sentence S2 of the first response 18 to the TTS engine and continue monitoring for the presence of the second response 19 (or the refined portion 19B thereof) while audio data for the second sentence S2 is being generated or rendered. In these implementations, the TTS engine 114 can generate audio data for the second sentence S1, and the audio data for the second sentence S2 can be rendered subsequent to the audio data for the first sentence S1, without any intervening audio data. If the second response monitoring engine 117 determines that the second response 19 (or the refined portion 19B) is received during rendering of the audio data for the second sentence S2 (or is received within the predefined period of time since the rendering of the audio data for the second sentence S2 is complete), audio data for the second response 19 (or the refined portion 19B) can be rendered subsequent to the audio data for the second sentence S2, without any intervening audio data.

Continuing with the particular example above, the refined portion 19B (e.g., "the most common reason for residential basement leaking is . . . ") can be received or detected by the second response monitoring engine 117 prior to the complete rendering of the audio data for the first sentence of "So sorry to hear that", or within the aforementioned predefined period of time. In this case, audio data of the refined portion 19B (e.g., "the most common reason for residential basement leaking is . . . ") can be rendered subsequent to the audio data for the first sentence. The audio data for the refined portion 19B can be rendered without any intervening audio data between the audio data for the first sentence and the audio data for the refined portion 19B.

Continuing with the particular example above, the refined portion 19B (e.g., "the most common reason for residential basement leaking is . . . ") can be received or detected by the second response monitoring engine 117 beyond the predefined period of time since the complete rendering of the audio data for the first sentence. Yet the refined portion 19B can be received/detected prior to the complete rendering of the audio data for the second sentence of "There could be several reasons", or received within the predefined period of time since the audio data for the second sentence is rendered completely. In these cases, audio data of the refined portion 19B (e.g., "the most common reason for residential basement leaking is . . . ") can be rendered subsequent to the audio data for the second sentence. The audio data for the refined portion 19B can be rendered without any intervening audio data between the audio data for the second sentence and the audio data for the refined portion 19B. Descriptions for similar situations where the refined portion 19B (or the second response 19) is received beyond the predefined period of time since the complete rendering of the audio data for the second sentence is not repeated herein for the sake of clarity.

In various implementations, the second response monitoring engine 117 can pause or stop monitoring for the presence of the second response 19 (or the refined portion 19B) once receiving the second response 19 (or the refined portion 19B).

In some implementations, the first response 18 can be divided into the first portion 18A and the second portion 18B based on a location of a first sentence that makes a factual statement of one or more entities in the user utterance 14B. For instance, in response to determining that the fourth sentence of the first response 18 is the first sentence making a factual statement, the first response 18 can be divided into the first portion 18A that include the first, second, and third sentences and the second portion 18A that include the fourth sentence and any sentence(s) succeeding the fourth sentence. In some other implementations, a length of the first portion 18A can be determined based on a type of the first LLM 190A. For instance, the first LLM 190A can be trained to make no factual statement for the first couple of sentences of the first response 18. In this case, the first couple of sentences (e.g., a predetermined number of sentences at the very beginning of the first response 18) can be included in the first portion 18A, while any sentence(s) succeeding the first couple of sentences are included in the second portion 18B. It is noted that, in some implementations, the first response 18 can include and only include the first portion 18A, where the entire first portion 18A makes no factual statement.

In various implementations, the first portion 18A of the first response 18 can be rendered at a predetermined speed. For instance, depending on a condition of the network connection estimated between the client device 10 that hosts the first LLM 190A and a server device that hosts the second LLM 190B, a speed for rendering the first portion 18A of the first response 18 can be adjusted. Additionally or alternatively, the first portion 18A (or in particular, the first sentence S1) can be rendered in a particular tone (e.g., encouraging, caring, etc.) based on a type and/or content of the user utterance 14B.

In various implementations, the second portion 18B of the first response is not rendered via the client device 10 to user R. In some other implementations, the second portion 18B may be rendered to user R in certain situations (e.g., the network connection between the client device 10 and the server device being extremely poor, etc.). For instance, in response to determining that the second response 19 (or the refined portion 19B of the second response 19) has not been received within an additional predefined period of time since the complete rendering of the last sentence (i.e., Sn) in the first portion 18A of the first response 18, the second portion 18B may be provided to the TTS engine 114, to generate audio data for the second portion 18B. The audio data for the second portion 18B can be rendered subsequent to the rendering of the sentence Sn. The additional predefined period of time can be the same as, or different from, the predefined period of time. For instance, the additional predefined period of time can be longer than the predefined period of time. In this case, once the second response 19 or the refined portion 19B is received, audio data generated for the received second response 19 (or the refined portion 19B) can still be rendered subsequent to the rendering of the first response 18 in its entirety. For instance, customized audio data such as "Let me provide you with more accurate information here" can be rendered prior to the rendering of the audio data generated for the received second response 19 (or the refined portion 19B) and subsequent to the rendering of the audio data for the first response 18.

It is noted that, while FIGS. 1B and 1C indicates audible rendering of the first portion 18A and/or the refined portion 19B, in various other implementations, these portions (e.g., 18A or 19B, or other aspects) can be rendered visually instead of being rendered audibly. For example, in response to receiving a typed input from a user via a user input device (e.g., keyboard), the first portion (e.g., a first sentence of the first response 18, which is generated using the first LLM 190A) can be rendered visually to the user at a display, and the refined portion 19B generated using the second LLM 190B can also be rendered visually at the display, despite the fact that the refined portion 19B may be rendered, e.g., after 0.5 seconds (or other short period of time) since the first sentence is visually rendered.

For instance, given the typed input of "how to fix a blank thermostat", the first sentence (e.g., "There can be several reasons for a blank thermostat.") of the first response 18 can be rendered visually as an immediate response to the typed input. The refined portion 19b can be rendered visually and subsequent to the first sentence, suggesting—"The first thing you may want to do is to check or replace the battery for a battery-operated thermostat". The refined portion 19B may be rendered to provide more sophisticated and accurate content than the second portion 18B (if there is any, also note that the second portion 18B may be partially rendered or may not be rendered at all). For instance, in some implementations, the first sentence and/or the second portion 18B is not to make factual statement, while the refined portion may include one or more factual statements (e.g., year a concept or theory is introduced, a name of the author of the book or painting, a location where an event occurs, a size of a company, a total amount of time spent in building a structure, etc.) regarding one or more entities referenced in the typed input.

Figure 2:
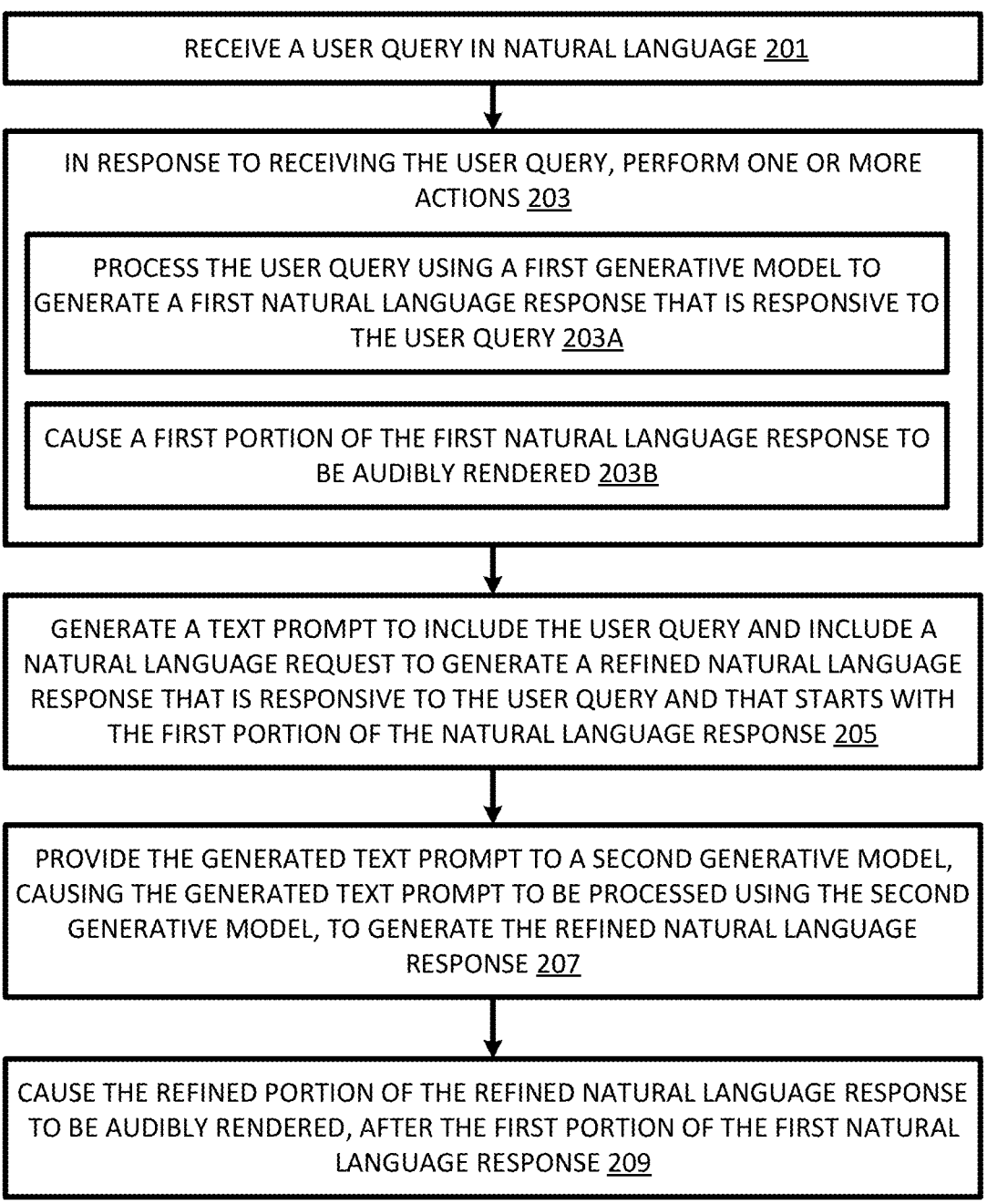
FIG. 2 depicts a flowchart illustrating an example method of generating content responsive to a user request to generate content, in accordance with various aspects of the present disclosure.

Turning now to FIG. 2, a flowchart is depicted that illustrates an example method of generating content responsive to a user request to generate content, in accordance with various aspects of the present disclosure. For convenience, the operations of the method 200 are described with reference to a system that performs the operations. This system of the method 300 includes one or more processors, memory, and/or other component(s) of computing device(s) (e.g., client computing device 10 of FIG. 1, one or more servers, and/or other computing devices). Moreover, while operations of the method 200 are shown in a particular order, this is not meant to be limiting. One or more operations may be reordered, omitted, and/or added.

At block 201, the system receives a user query in natural language. In some implementations, the user query in natural language can be determined, for instance, from a user utterance received at a client device. For instance, the user utterance can be processed using one or more components (e.g., the aforementioned ASR engine and/or NLU engine), to determine that the user utterance includes the user query. In some implementations, the user query can be a query seeking information for a particular entity (e.g., object, event, theory, etc.). As a non-limiting example, the user query can be "how to cook a turkey", which can be determined from a user utterance such as "okay, how to cook a turkey?"

As another example, the user utterance may be, for instance, "okay, how to cook a turkey?This is my first time cooking a turkey". In this example, a first portion of the user utterance that corresponds to the user query of "how to cook a turkey" may be processed, and a user intent to perform an action of searching a recipe to cook a turkey can be fulfilled, with or without processing and fulfilling a second portion of the user utterance that corresponds to a user statement of "This is my first time cooking a turkey". By partially fulfilling the user intent that corresponds to performing the action of searching a recipe to cook a turkey (i.e., without determining the user intent based further on the user statement of "This is my first time cooking a turkey"), latency in rendering a response responsive to the user query of "how to cook a turkey" may be reduced, while computing resources in fully fulfilling a user intent that corresponds to the entire user utterance can be reserved.

In some implementations, the user query in natural language can be a textual input received from a user. The textual input can be received, for instance, via a touchpad, a keyboard, or any other applicable input unit/device of the client device.

At block 203, in response to receiving the user query, the system performs one or more actions. For instance, in response to receiving the user query, the system can process the user query using a first generative model to generate a first natural language response that is responsive to the user query (203A). The system can further cause a first portion of the first natural language response to be rendered (audibly or visually) (203B). In some implementations, the first generative model is a first large language model (LLM). In some implementations, the first portion of the first natural language response can be a single sentence (e.g., "cooking a turkey can be a lot of fun"), which is generated as the first sentence of the natural language response. In some other implementations, the first portion of the first natural language response can include a predetermined number of sentences that the first natural language response starts with.

In some implementations, the first generative model can be utilized to generate a first model output based on the user query, where the first natural language response is determined based on the first model output. In some implementations, the first generative model can be trained to make no factual statement within the first portion of the first natural language response, while allowing or configuring the second portion of the first natural language response to include (or start with) a sentence that makes factual statement (e.g., time or a time range needed to generally cook a turkey). As a result, the first portion of the natural language response includes no factual statement for one or more entities determined from the user query.

In some other implementations, the first generative model can be trained or fine-tuned to avoid making any factual statement. In this case, the natural language response (including the first portion and any additional portions, e.g., the second portion) can include no factual statement at all.

It is noted that while the first generative model is utilized in various implementations to generate the first natural language response, in some other implementations, the first natural language response may not be determined/generated using the first generative model. For example, the first natural language response may include at least a default text string (e.g., a default sentence like "Good question!") as the first portion to be rendered by default and immediately (e.g., within 0.1 s) in response to the user query. This may apply, for instance, as long as the user utterance is determined to include the user query (e.g., "Is burning bush invasive?"). As another example, the first natural language response may be generated based on a template (e.g., "So you'd like to know more about [entity]?"), where the template can be selected from a plurality of predefined templates each having one or more slots to be filled based on content of the user query. The content of the user query (e.g., "What is Paris known for"), for instance, can be an entity (e.g., "Paris") identified based on the user query.

At block 205, the system generates a text prompt to include the user query and include a natural language request to generate a refined natural language response that is responsive to the user query and that starts with the first portion of the natural language response. For instance, given that the user query is "how to cook a turkey" and that the first portion is "cooking a turkey can be a lot of fun", the text prompt can be, "draft a response that starts with 'cooking a turkey can be a lot of fun', responsive to the user query of 'how to cook a turkey'". In some implementations, optionally, the text prompt can further include a word limit for the refined natural language response.

In some implementations, alternatively, instead of being a request to generate a refined natural language response that is responsive to the user query and that starts with the first portion of the natural language response, the natural language request can be a request to generate a refined natural language response that is responsive to the user query and that follows (but does not include) the first portion of the natural language response. For instance, the text prompt can be, "draft a response responsive to the user query of 'how to cook a turkey', following content of 'cooking a turkey can be a lot of fun'", instead of "draft a response that starts with 'cooking a turkey can be a lot of fun', responsive to the user query of 'how to cook a turkey'".

At block 207, the system provides the generated text prompt to a second generative model, causing the generated text prompt to be processed using the second generative model. The generated text prompt can be processed using the second generative model, to generate the refined natural language response that starts with (or follows) the first portion and that includes a refined portion succeeding (or to succeed) the first portion.

The second generative model can be, for instance, a second LLM. The second LLM can be larger than the first LLM by having a higher quantity of parameters than the first LLM. In various implementations, the first LLM can be a smaller LLM, and the second LLM can be a larger LLM, where the smaller LLM is a quantized and/or pruned version of the larger LLM. In some other implementations, the smaller LLM is not a quantized and/or pruned version of the larger LLM but, instead, is wholly independent of the larger LLM. For example, the smaller LLM can have a different architecture relative to the larger LLM and/or can be trained on a unique set of training data relative to the larger LLM. For instance, the input dimensions of the smaller LLM can be smaller than those of the larger LLM, the output dimensions of the smaller LLM can be smaller than those of the larger LLM, and/or the smaller LLM can include various intermediate layers that vary in size and/or type relative to those of the larger LLM.

The smaller LLM can be more computationally efficient than the larger LLM. For example, processing a request utilizing the smaller LLM can occur with less latency than processing the request utilizing the larger LLM. As another example, processing the request utilizing the smaller LLM can utilize less memory, processor, and/or power resource(s) than processing the request utilizing the larger LLM. In some implementations, the smaller LLM can be on-device at the client device, and the larger LLM can be remote to the client device. For instance, the larger LLM can be at a server device that is in communication with the client device. Utilizing the smaller LLM (instead of the larger LLM) to generate the first natural language response and causing a portion of the first natural language response to be visually rendered responsive to the user request can more quickly satisfy informational needs of a user that provides the user utterance.

It is noted that, while in various implementations, the text prompt at block 205 depends on the first portion of the natural language response (indicating that processing of the text prompt is subsequent to the processing of the user query using the first generative model), in some implementations, the text prompt generated at block 205 may alternatively be based on the user query, but not include the natural language request to generate a refined natural language response that starts with or follows the first portion of the natural language response. For example, the text prompt at block 205 can be the same as the user query, or can include the user query. In this example, processing of the text prompt using the second generative model can be in parallel with processing of the user query using the first generative model (or generating the first natural language response using the aforementioned default text string or the template). This may help reduce the latency in rendering the refined natural language response to a user that provides the user query.

At block 209, the system causes the refined portion of the refined natural language response to be rendered (e.g., audibly or visually), after rendering the first portion of the first natural language response. In some implementations, the refined portion of the refined natural language response may be rendered immediately after the first portion of the first natural language response, without the second portion (if there is any) of the first natural language response being rendered. For instance, the refined portion can be rendered audibly subsequent to the first portion of the first natural language response, without any intervening audio data (e.g., audio data for the second portion of the first natural language response) being present between audio data for the first portion and audio data for the refined portion.

In some implementations, the first portion of the first natural language response may include inaccurate information (e.g., which may be due to inaccurate speech recognition, reflects inaccurate understanding of the user query, or even includes an inaccurate factual statement, etc.). In these implementations, the refined portion of the refined natural language response may include a statement correcting the inaccurate information in the first portion of the first natural language response. For example, the user may provide an utterance of "How about visiting Wales for the spring vacation", and the first portion of the first natural language response may be a sentence of "Whales are one of the most beautiful animals on earth". Such sentence may be generated, for instance, based on inaccurate speech recognition and/or natural language understanding that mixes the animal "whales" with the country "Wales". In this example, output of the second generative model (which may be trained sufficiently using a large set of data including content such as "the best whale-watching season in the US is summer to fall", "Wales has some of the most beautiful beaches in the world to visit", etc.) based on processing of the text prompt (that includes, for instance, generate a refined response for a user query of "How about visiting Wales for the spring vacation", the refined response is to follow the sentence of "Whales are one of the most beautiful animals on earth") may indicates that the sentence of "Whales are one of the most beautiful animals on earth" includes inaccurate information for the user query.

Continuing with the above example, the output of the second generative model may be processed to determine the refined portion that includes a statement to correct the inaccurate information in the first portion of the natural language response (in this example, i.e., the sentence of "Whales are one of the most beautiful animals on earth"). For instance, the refined portion that includes a statement such as "Or perhaps you mean Wales the country?" that corrects the inaccurate information in the first portion (e.g., by mentioning "whales", the animals), followed by additional information such as "In which case, I'd like to introduce some nice beaches to visit in Wales . . . " In other words, in this example, subsequent to the audible rendering of "Whales are one of the most beautiful animals on earth" (the first portion of the natural language response), the refined portion can be audibly rendered with the statement of "Or perhaps you mean Wales the country?", to correct inaccurate information, and further with the additional information of "In which case, I'd like to introduce some nice beaches to visit in Wales . . . ", to provide more accurate and user-desired information.

It is noted that the user query may be determined from a textual input instead of audible input (e.g., the user utterance). In this case, if the refined portion of the refined natural language response indicates that the first portion of the natural language response includes inaccurate information, the first portion of the natural language response (that includes the inaccurate information) visually rendered within a user interface of a client device can be erased by the system and be replaced with the refined portion of the refined natural language response. For instance, the user query may be for an explanation of "general relativity" based on text input of "explain general relativity", and the first portion of the natural language response generated by the first generative model may be "General relativity has become the foundation for today's understanding of the cosmos. It is a theory developed by Einstein in 1905" and thus includes inaccurate information (i.e., general relativity was developed by Einstein in 1915 while special relativity was developed by Einstein in 1905). In this case, the refined portion of the refined natural language response may start or include content of "It is a theory developed by Einstein in 1915, and is the current description of gravitation in modern physics . . . ", which indicates the existence of inaccurate information in the first portion of the natural language response that has been rendered to a user within the aforementioned user interface of the client device. In response to determining that the refined portion indicates that the first portion includes inaccurate information, the inaccurate information (e.g., "It is a theory developed by Einstein in 1905"") rendered at the user interface can be erased (e.g., word-by-word or all at once) and be replaced with the refined portion. In this case, after replacing the inaccurate information with the refined portion, content shown at the user interface can be, for instance, "General relativity has become the foundation for today's understanding of the cosmos. It is a theory developed by Einstein in 1915, and is the current description of gravitation in modern physics . . . " Put another way, when the first portion and the refined portion contradicts, the system described in this disclosure may provide a backwards edit that removes the inaccurate information in the first portion from being rendered and causes visual rendering of the refined portion to provide more accurate information.

In some implementations, the system may further estimate a latency between rendering of the first portion of the natural language response and receiving of the refined portion of the refined natural language response. In some implementations, the system may dynamically adjust the speed that the first portion of the natural language response is audibly rendered based on the estimated latency. This reduces the time interval between the rendering of the first portion and the rendering of the refined portion.

Figure 3:
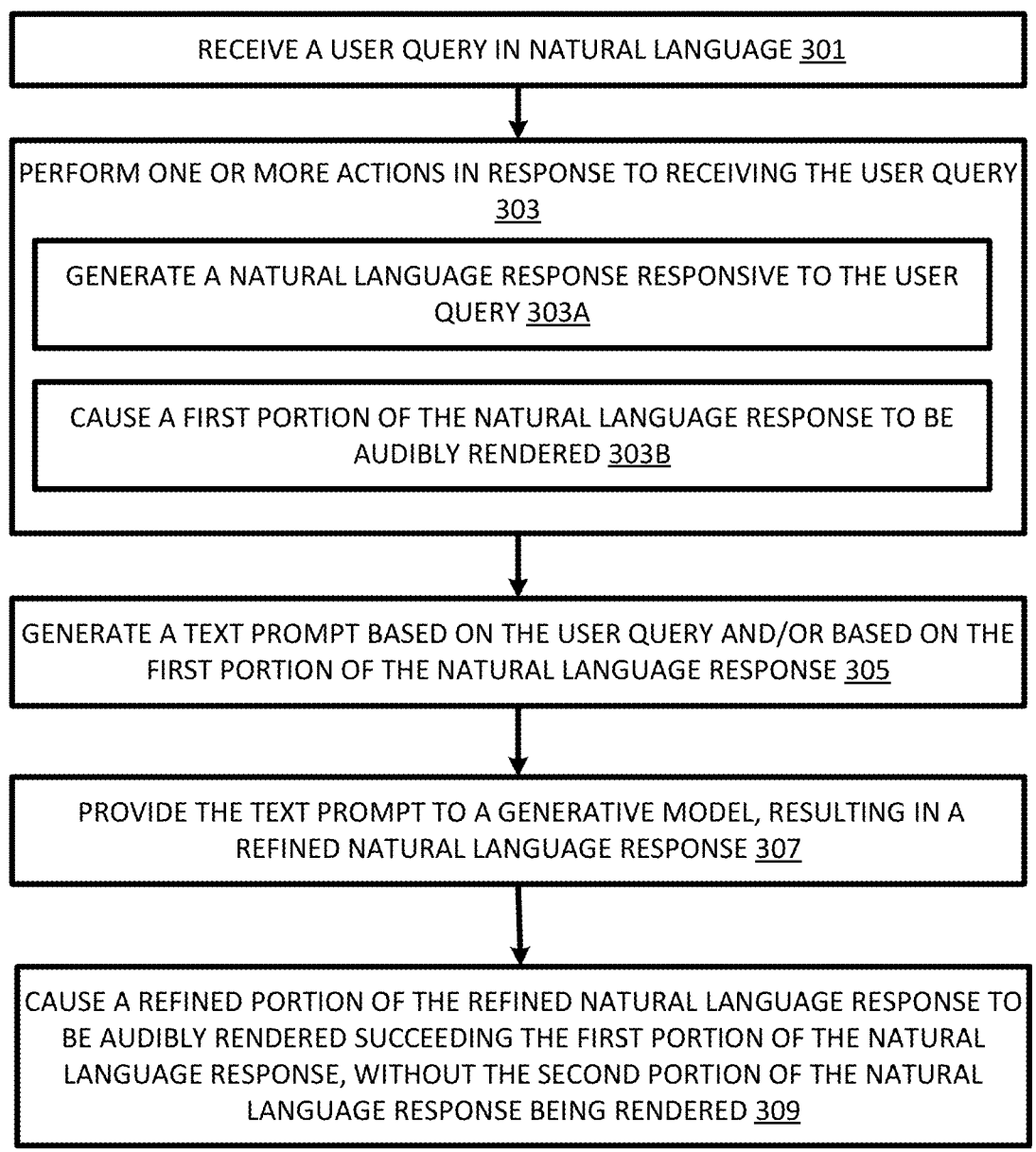
FIG. 3 depicts a flowchart illustrating another example method of generating content responsive to a user request to generate content, in accordance with various aspects of the present disclosure.

Turning now to FIG. 3, a flowchart is depicted that illustrates an example method of generating content responsive to a user request to generate content, in accordance with various aspects of the present disclosure. For convenience, the operations of the method 300 are described with reference to a system that performs the operations. This system of the method 300 includes one or more processors, memory, and/or other component(s) of computing device(s) (e.g., client computing device 10 of FIG. 1, one or more servers, and/or other computing devices). Moreover, while operations of the method 300 are shown in a particular order, this is not meant to be limiting. One or more operations may be reordered, omitted, and/or added.

At block 301, the system receives a user query in natural language. In some implementations, the user query in natural language can be a textual input received from a user or can be a speech recognition of a spoken input from the user.

At block 303, the system performs one or more actions in response to receiving the user query. The one or more action can include: generating a natural language response that is responsive to the user query (303A), and/or causing a first portion of the natural language response to be audibly rendered (303B). In some implementations, the first portion of the natural language response is a first sentence of the natural language response. In some implementations, alternatively or additionally, the first portion of the natural language response includes no factual statement. For instance, if the user query includes one or more entities, the first portion of the natural language response can make no factual statement for the one or more entities determined from the user query.

In some implementations, the system can generate a text prompt based on the user query and/or the first portion of the natural language response (block 305) and provide the generated text prompt to a generative model (block 307). In some implementations, the system provides the generated text prompt to the generative model (e.g., LLM), which causes the generated text prompt to be processed as input using the generative model, to generate a generative model output from which the refined natural language response is determined. The system may generate the text prompt prior to or while the first portion of the natural language response is being audibly rendered. The text prompt can include, for instance, the user query and the first portion of the natural language model. In this case, the system may generate the text prompt in response to the first portion of the natural language response being determined.

In some implementations, the text prompt can include the user query and a natural language request/instruction to generate a refined natural language response that is responsive to the user query and that starts with the first portion of the natural language response. In some implementations, the generated text prompt can be processed using the generative model, to generate model output from which the refined natural language response is derived, where the refined natural language response starts with the first portion and includes a refined portion succeeding the first portion.

In some implementations, the natural language response (at block 303A) is generated using a template with one or more fields of the template filled with information parsed from the user query. In some implementations, the natural language response can be generated using an additional generative model, where the additional generative model includes a lower quantity of parameters than the generative model. In some implementations, the additional generative model is trained or fine-tuned to avoid making factual statement(s) (e.g., at least for the first portion of the natural language response).

In some implementations, at block 309, the system can cause the refined portion of the refined natural language response to be audibly rendered succeeding the first portion of the natural language response, without the second portion of the natural language response being rendered (e.g., therebetween).

Figure 4:
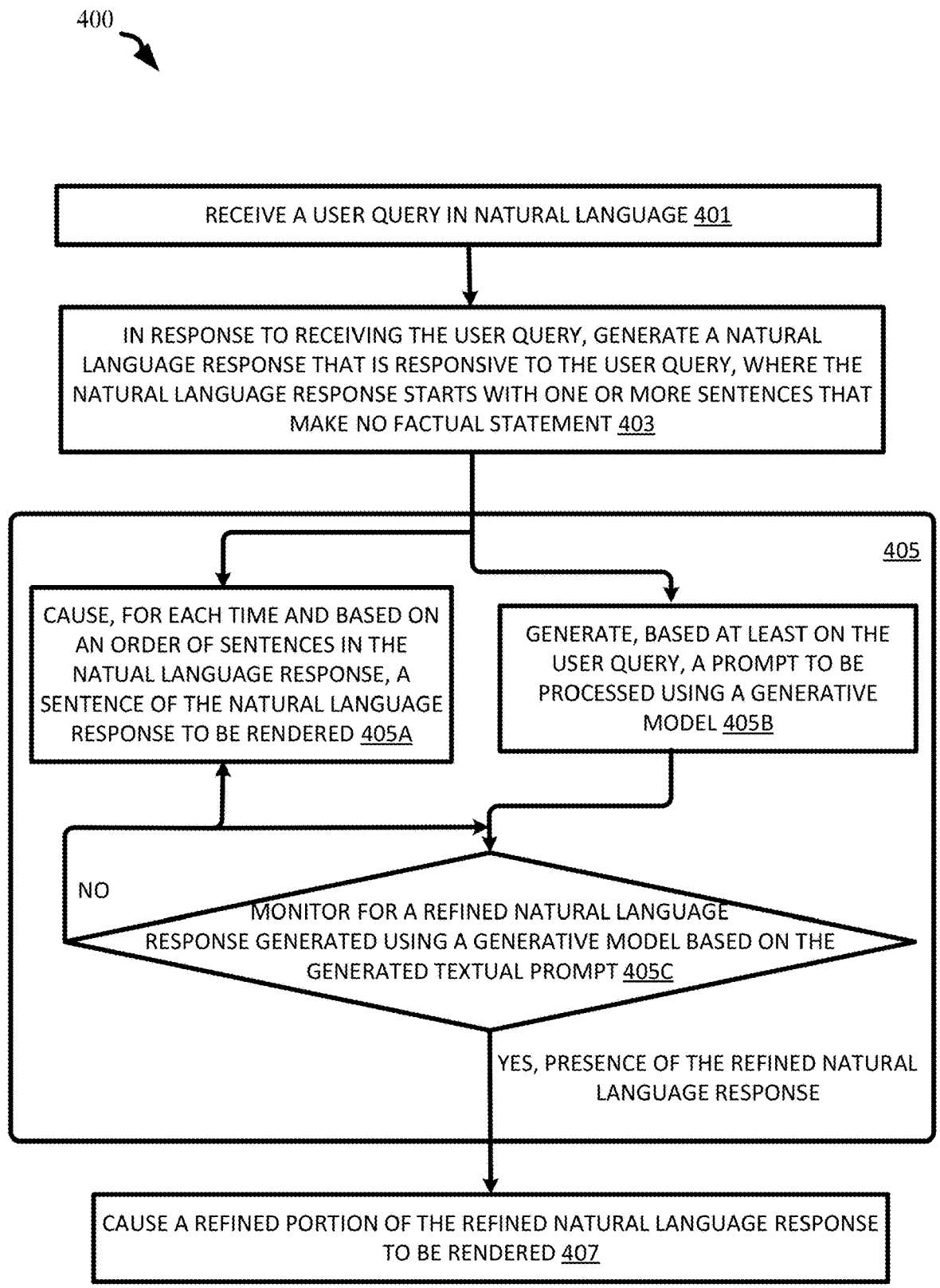
FIG. 4 depicts a flowchart illustrating a further example method of generating content responsive to a user request to generate content, in accordance with various aspects of the present disclosure.

Turning now to FIG. 4, a flowchart is depicted that illustrates another example method of generating content responsive to a user request to generate content, in accordance with various aspects of the present disclosure. This system of the method 400 includes one or more processors, memory, and/or other component(s) of computing device(s) (e.g., client computing device 10 of FIG. 1, one or more servers, and/or other computing devices). Moreover, while operations of the method 400 are shown in a particular order, this is not meant to be limiting. One or more operations may be reordered, omitted, and/or added.

At block 401, the system receives a user query in natural language. The user query in natural language can be determined from a spoken utterance (or other types of user input, e.g., touch input or typed input) from a user. For instance, as described above, the user query can be a query for reason(s) that cause basement leaking (or other event). In other examples, the user query can be a query for describing or introducing a theory or other object.

At block 403, the system, in response to receiving the user query, generates a natural language response that is responsive to the user query, where the natural language response starts with one or more sentences that make no factual statement. In some implementations, optionally, the natural language response can include and only include the one or more sentences that make no factual statement. In some other implementations, optionally, the natural language response can further include one or more additional sentences following the one or more sentences that make no factual statement, where the one or more additional sentences can include sentence(s) that each make a factual statement.

In some implementations, the natural language response can be generated based on filling one or more slots of a template with content determined from the user query in natural language. In some other implementations, the natural language response can be generated based on processing the user query (or a prompt generated based on the user query) using a generative model (e.g., the aforementioned smaller LLM).

At block 405, the system performs one or more actions. For instance, the system can cause a first sentence of the natural language response to be rendered via a computing device (405A) and can generate a textual prompt to be processed using a generative model (e.g., the aforementioned larger LLM) (405B). The textual prompt can be generated based at least on the user query. For instance, the textual prompt can be generated to include the user query only, or to include both the user query and the first sentence of the natural language response. The textual prompt can be processed using the generative model (e.g., the larger LLM), to generate a model output from which a refined natural language response is determined. The system can further monitor for receiving the refined natural language response (405C).

In some implementations, the textual prompt can include the user query. In some implementations, the textual prompt can further include an instruction that configures the refined natural language response to start with the first sentence of the natural language response (that makes no factual statement). In some implementations, alternatively, the textual prompt can further include an instruction that configures the refined natural language response to start with the one or more sentences of the natural language response that make no factual statement.

At block 407, the system, in response to determining that the refined natural language response (or a refined portion of the refined natural language response) is received, can cause the refined portion of the refined natural language response to be rendered. The refined portion of the refined natural language response can be content of the refined natural language response that is not included in the natural language response. For example, the refined natural language response may include the first sentence of the natural language response (due to the instruction to generate the refined natural language response requires the refined natural language response to start with the first sentence from the natural language response). In this example, the refined portion of the refined natural language response can be the refined natural language response that excludes the first sentence (e.g., that is from the natural language response and that the refined natural language response starts with).

In some implementations, the system, in response to determining that the refined natural language response (or a refined portion of the refined natural language response) is not received (e.g., when the first sentence is completed rendered or within a predefined period of time subsequent to the rendering of the first sentence), can cause a second sentence of the natural language response to be rendered while continuing to monitor for a presence of the refined natural language response (or the refined portion thereof).

Figure 5:
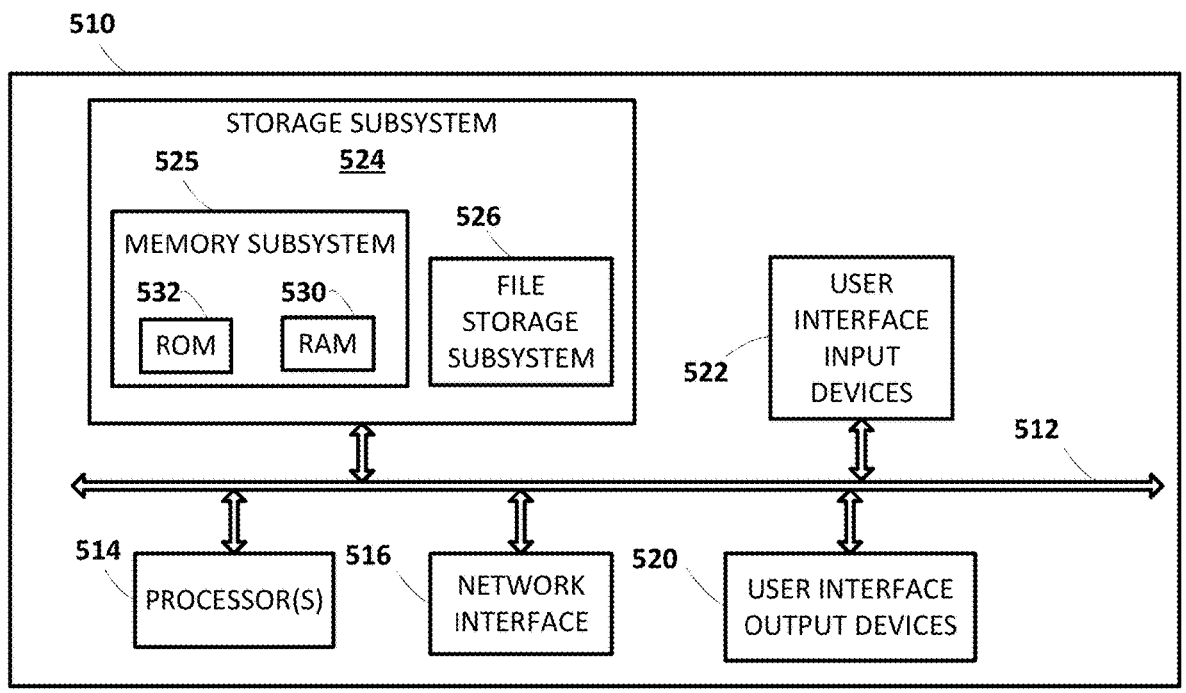
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based LLM-based assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Some other implementations disclosed herein recognize that training a generative model can require a significant quantity (e.g., millions) of training instances. Due to the significant quantity of training instances needed, many training instances will lack input and/or output properties that are desired when the generative model is deployed for utilization. For example, some training instance outputs for an LLM can be undesirably grammatically incorrect, undesirably too concise, undesirably too robust, etc. Also, for example, some training instance inputs for an LLM can lack desired contextual data such as user attribute(s) associated with the input, conversational history associated with the input, etc. As a result of many of the LLM training instances lacking desired input and/or output properties, the LLM will, after training and when deployed, generate many instances of output that likewise lack the desired output properties.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more transitory or non-transitory computer readable storage media storing computer instructions executable by one or more processors to perform any of the aforementioned methods. Some implementations also include a computer program product including instructions executable by one or more processors to perform any of the aforementioned methods.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

In various implementations, a method implemented using one or more processors is provided, and the method includes: receiving a user query that includes natural language, the user query being generated based on user interface input at a client device. The user interface input, based on which the user query in natural language is generated, can be a typed input or a spoken input (e.g., from a human user).

In various implementations, the method further includes: in response to receiving the user query, processing the user query (e.g., using a template or a first generative model), to generate a natural language response that is responsive to the user query. In some implementations, the template can be selected from a plurality of pre-configured templates based on a type (and/or content) of the user query. In some implementations, the template can include one or more pre-configured sentences having one or more slots to be filled based on content (and/or a context, e.g., location, time, etc.) of the user query. For instance, given the user query being a user utterance of "Why my thermostat is blank", a template that contains content such as "Oh no, sorry to hear that. There are several reasons why _ . . . " can be selected (e.g., based on the user utterance including keyword(s) such as "why"), and a slot of the selected template can be filled using content of the user utterance (e.g., "my thermostat is blank"), to complete the template. This can result in a completed template, such as "Oh no, sorry to hear that. There are several reasons why a thermostat is blank." The completed template can be utilized as the natural language response that is responsive to the user query.

In some implementations, instead of using the template, the user query can be processed as input using the first generative model (e.g., the aforementioned smaller LLM), to generate a first model output from which the natural language response that is responsive to the user query is determined/generated. The first generative model can be trained (or fine-tuned) to generate the natural language response with a certain length (e.g., less than 40 words, 25-45 words, etc.), to have certain content (e.g., "Oh no . . . ") that reflects a certain tone (e.g., caring, etc.) responsive to the user query, and/or to make no factual statement (e.g., for the entire natural language response, for a predefined number of sentences that the natural language response starts with, etc.).

In some implementations, the natural language response (e.g., generated using the template or the first generative model) can include a first portion and/or a second portion succeeding the first portion. The first portion of the natural language response can include (and sometimes only include) a first sentence that the natural language response starts with. In some implementations, the first portion of the natural language response can, for instance, include no factual statements for one or more entities of the user query. In some implementations, the second portion of the natural language response can (but does not necessarily need to) include factual statement(s) for one or more entities of the user query.

In various implementations, the method further includes: in response to receiving the user query, causing at least the first portion of the natural language response to be audibly rendered. In some implementations, the first portion of the natural language response can be audibly rendered via a client device that receives the user query. In some implementations, the first portion of the natural language response can be audibly rendered via a device that is different from (but in communication with) a client device that receives the user query. In some implementations, optionally the first portion of the natural language response can be audibly rendered at a speed determined based on a length of the first portion. For instance, the speed can be a slow speed if the first portion of the natural language response is of a short length (e.g., less than a first predetermined number of words), or can be a fast speed if the first portion of the natural language response is of a long length (e.g., greater than a second predetermined number of words), or can be an intermediate speed if the first portion of the natural language response is of a length between the first and second predetermined number of words.

In various implementations, the method further includes: in response to receiving the user query, generating a prompt that includes at least the user query (or a portion thereof) and a natural language request to generate a response (e.g., a refined response) that is responsive to the user query. For instance, the prompt can be "the user query is 'why is my thermostat blank', generate a response to this user query". In some varied versions of these implementations, the prompt can include the user query, the first portion of the natural language response, and a natural language request to generate a response that is responsive to the user query and that is to follow the first portion of the natural language response.

For example, the natural language response can include the first portion of "Oh no, sorry to hear that." In this example, the prompt can be: "the user query is 'why is my thermostat blank', generate a refined response to this user query starting with sentence(s) of 'Oh no, sorry to hear that.'" The prompt can alternatively be: "the user query is 'why is my thermostat blank', generate a refined response to this user query to follow sentence(s) of 'Oh no, sorry to hear that.'" In this latter case, the sentence(s) of "Oh no, sorry to hear that." does not need to be repeatedly included in both the natural language response and the refined response, so as to save computing resources associated with generating the refined response and/or network resources associated with transmitting the refined response. As another example, the natural language response can include the first portion of "Oh no, sorry to hear that. There are several reasons why a thermostat is blank." In this example, the prompt can be, for instance, "the user query is 'why is my thermostat blank', generate a refined response to this user query that follows sentence(s) of 'Oh no, sorry to hear that. There are several reasons why a thermostat is blank.'" These examples are provided here for illustrative purposes only, and are not intended to be limiting.

In various implementations, the method further includes: in response to receiving the user query, causing the generated prompt to be processed using a second generative model, resulting in a refined natural language response that includes a refined portion to succeed the first portion. In some implementations, the refined natural language response can include the first portion, where the refined portion succeeds the first portion. In some other implementations, the refined natural language response does not include the first portion and instead, includes and only includes the refined portion, where the refined portion is to be rendered following the rendering of the first portion.

In some implementations, the second generative model includes a higher quantity of parameters than does the first generative model. For example, the first generative model can be a smaller large language model (LLM) having less than 100 billion parameters, while the second generative model can be a larger LLM that includes over 200 billion parameters. Due to the second generative model being the larger LLM, the refined portion can provide more accurate, sophisticated, and/or user-desired content responsive to the user query than the second portion (in particular when the second portion contains one or more factual statements of one or more entities (e.g., "leaking") mentioned in the user query).

In some implementations, the first generative model (e.g., the smaller LLM) can be a quantized and/or pruned version of the second generative model (e.g., a larger LLM). In some other implementations, the first generative model (e.g., the smaller LLM) is not a quantized and/or pruned version of the second generative model (e.g., the larger LLM) but, instead, is wholly independent of the second generative model. For example, the first generative model can have a different architecture relative to the second generative model and/or can be trained on a unique set of training data relative to the second generative model. For instance, the input dimensions of the first generative model can be smaller than those of the second generative model, the output dimensions of the first generative model can be smaller than those of the v, and/or the first generative model can include various intermediate layers that vary in size and/or type relative to those of the second generative model.

In some implementations, the first generative model can be more computationally efficient than the second generative model. For example, processing a request utilizing the first generative model can occur with less latency than processing the request utilizing the second generative model. As another example, processing the request utilizing the first generative model can utilize less memory, processor, and/or power resource(s) than processing the request utilizing the second generative model. In some implementations, the first generative model can be on-device at the client device, and the second generative model can be remote to the client device. For instance, the second generative model can be at a server device that is in communication with the client device. Utilizing the first generative model (instead of the second generative model) to generate the initial content and causing the generated initial content to be visually rendered responsive to the user request can more quickly satisfy informational needs of a user that provides the spoken utterance or the user request.

In some implementations, the first generative model is stored at the client device and the second generative model is stored at a server device that is remote from the client device. For instance, memory constraints of the client device may prevent the second generative model from being utilized or stored at the client device. In some other implementations, the first and second generative models are both stored at the client device (e.g., in case there is sufficient memory at the client device). In some other implementations, the first and second generative models are both stored at the server device.

In some implementations, at least part of the first portion of the natural language response is audibly rendered prior to the entirety of the refined response being generated. In some implementations, causing at least the first portion of the natural language response to be audibly rendered includes: causing only the first portion of the natural language response to be rendered.

In various implementations, the method further includes: in response to receiving the user query, causing the refined portion of the refined natural language response to be audibly rendered. In some implementations, the refined portion of the refined natural language response is audibly rendered subsequent to the rendering of the first portion. Optionally, the refined portion of the refined natural language response is audibly rendered subsequent to the rendering of the first portion, without the second portion of the natural language response being rendered audibly therebetween (i.e., between the first portion and the refined portion).

In some implementations, the refined portion of the refined natural language response to be audibly rendered immediately succeeding the first portion. The "immediately succeeding" here can mean that the refined portion is rendered within 1 second, 0.5 second, 0.1 second or other short enough duration of completing the rendering of the first portion, without any intervening audible output between the first and refined portions. By rendering the first portion immediately (e.g., within 1 second, 0.5 second, etc.) response to the user query and rendering the refined portion (instead of the first portion) immediately succeeding the first portion, not only a user is quickly engaged in human-to-computer dialog(s), but also response with enhanced accuracy (e.g., more accurate factual statements) is provided.

In various implementations, the method further includes: determining, prior to causing the generated prompt to be processed by the second generative model, an estimated delay for receiving the refined response; and determining, based on the estimated delay, a length of the first portion from the natural language response. In various implementations, determining the estimated delay can be based on a measure or expected current server load associated with one or more servers hosting the second generative model. As a non-limiting example, the natural language response may include a first sentence and a second sentence totaling a number of 20 words. In this non-limiting example, if the current server load associated with the one or more servers that host the second generative model is determined to be heavy, the system can determine an estimated delay and determine the number of sentences to be rendered based on the estimated delay. For instance, given the current server load being heavy, all the 20 words (including the first and second sentences) of the natural language response can be rendered as immediate response to the user query. If the current server load is determined to be light, the first sentence (which can have 10 words or 9 words, etc.) can be rendered as immediate response to the user query, while the second sentence is not rendered succeeding the first sentence.

In some implementations, alternatively or additionally, determining the estimated delay can be based on the user query (e.g., based on a length and/or a type of the user query, etc.). In some implementations, the first portion can be rendered audibly at a particular speed, where the particular speed can depend on the estimated delay determined based on the current server load (that is associated with one or more servers hosting the second generative model).

In various implementations, another method implemented using one or more processors is provided, and the method includes: receiving a user query that includes natural language, the user query being generated based on user interface input at a client device; in response to receiving the user query: generating a natural language response that is responsive to the user query, causing at least a first portion of the natural language response to be audibly rendered, and generating a text prompt that includes the user query, the first portion of the natural language response, and a natural language request to generate a refined response that is responsive to the user query and that is to follow the first portion of the natural language response. The method can further include, in response to receiving the user query and while the first portion of the natural language response is being audibly rendered: causing the generated text prompt to be processed using a generative model, resulting in a refined natural language response that includes a refined portion that is to follow the first portion. The method can further include: causing the refined portion of the refined natural language response to be audibly rendered succeeding audible rendering of the first portion of the natural language response. The refined portion of the refined natural language response can be audibly rendered succeeding audible rendering of the first portion of the natural language response, without any intervening audible rendering (e.g., excluding audible rendering of the second portion of the natural language response).

In various implementations, another method implemented using one or more processors is provided, and the method includes: receiving a user query that includes natural language, the user query being generated based on user interface input at a client device. In response to receiving the user query, the method further includes: generating a natural language response that is responsive to the user query; causing at least a first portion of the natural language response to be rendered via client device; while the first portion of the natural language response is being rendered via the client device: generating a prompt that includes the user query, the first portion of the natural language response, and a natural language request to generate a refined response that is responsive to the user query and that is to follow the first portion of the natural language response. The method further includes: causing the generated text prompt to be processed using a generative model, resulting in a refined natural language response that includes a refined portion to succeed the first portion; determining that the refined portion of the refined natural language response is not received when rendering of the first portion is complete; and in response to determining that the refined portion of the refined natural language response is not received when rendering of the first portion is complete, causing a sentence in a second portion of the natural language response that succeeds the first portion to be rendered, and causing the refined portion of the refined natural language response to be rendered succeeding the sentence in the second portion.

In various implementations, instead of processing the user query (which is determined from the user utterance) using the first LLM, a portion the user utterance that is determined to contain a user complete query can be processed using the first LLM, prior to or while an additional portion of the user utterance is still being processed (e.g., to determine a transcription of the user utterance in its entirety). The user utterance may be, for instance, "okay, how to cook a turkey?This is my first time cooking a turkey". In this case, a first portion of a transcription of the user utterance that corresponds to "how to cook a turkey" may be processed and determined to include a complete user query of "how to cook a turkey" in natural language. Prior to or while an additional portion of the transcription of the user utterance that corresponds to "This is my first time cooking a turkey" is being determined/generated, the first portion of the transcription can be processed as input using the first LLM (e.g., a smaller LLM), to generate an immediate response to the user utterance. The immediate response can be rendered in response to the user utterance. Alternatively, instead of rendering the immediate response in its entirety, a portion of the immediate response, such as a first sentence of the immediate response, can be rendered in response to the user utterance.

In the above example, subsequent to the additional portion of transcription being determined, the transcription of the user utterance in its entirety ("okay, how to cook a turkey?This is my first time cooking a turkey") can be processed as input using the second LLM (e.g., a larger LLM), to generate a refined response. The refined response can include a refined portion that follows or is to follow the first sentence of the immediate response. The refined portion can be rendered immediately succeeding the first sentence of the immediate response. With respect to the immediate response, the refined portion may be more user-specific/desired (as specified in the user utterance—"This is my first time cooking a turkey") by including a recipe that is friendly to those who have little cooking experience or who has never cooked turkey before. By partially fulfilling the user intent that corresponds to performing the action of searching a recipe to cook a turkey (i.e., without determining/modifying the user intent based further on the user statement of "This is my first time cooking a turkey"), latency in rendering an immediate response (or a portion thereof) responsive to the user query of "how to cook a turkey" may be reduced. By further providing the refined portion of the refined response immediately following the immediate response, more accurate or user-desired response can be provided in response to the user utterance.

What is claimed is:

1. A method implemented using one or more processors, the method comprising:
   receiving a user query that includes natural language, the user query being generated based on user interface input at a client device; and
   in response to receiving the user query:
      processing the user query, using a first generative model, to generate a natural language response that is responsive to the user query;
      causing at least a first portion of the natural language response to be rendered;
      generating a prompt that includes the user query, the first portion of the natural language response, and a natural language request to generate a refined response that is responsive to the user query and that is to follow the first portion of the natural language response;
      causing the generated prompt to be processed by a second generative model, resulting in a refined natural language response that includes a refined portion to succeed the first portion; and
      causing the refined portion of the refined natural language response to be rendered.

2. The method of claim 1, wherein the user interface input, based on which the user query is generated, is a typed input or is a spoken input.

3. The method of claim 1, wherein the second generative model includes a higher quantity of parameters than does the first generative model.

4. The method of claim 1, wherein the first portion of the natural language response is a first sentence of the natural language response.

5. The method of claim 1, wherein the first generative model is trained or fine-tuned to avoid making factual statements.

6. The method of claim 5, wherein the first portion of the natural language response includes no factual statements for one or more entities of the user query.

7. The method of claim 1, further comprising:
   estimating a latency, the latency being between rendering of the first portion of the natural language response and receiving of the refined portion of the refined natural language response; and
   determining, based on the latency, a speed that the first portion of the natural language response is rendered;

wherein causing the first portion of the natural language response to be rendered comprises causing the first portion to be audibly rendered at the speed.

8. The method of claim 1, wherein at least part of the first portion of the natural language response is rendered prior to the entirety of the refined response being generated.

9. The method of claim 1, wherein the first generative model is stored at the client device and wherein the second generative model is stored at a server device that is remote from the client device.

10. The method of claim 9, wherein memory constraints of the client device prevent the second generative model from being utilized at the client device.

11. The method of claim 1, wherein causing at least the first portion of the natural language response to be rendered comprises causing only the first portion of the natural language response to be rendered.

12. The method of claim 1, further comprising:
determining, prior to causing the generated prompt to be processed by the second generative model, an estimated delay for receiving the refined response;
determining, from the natural language response and based on the estimated delay, the first portion.

13. The method of claim 12, wherein determining the estimated delay is based on:
a measured or expected current server load associated with one or more servers hosting the second generative model; and/or
a length of the user query.

14. The method of claim 1, wherein the natural language response includes a second portion succeeding the first portion, and wherein the refined portion of the refined natural language response is rendered succeeding rendering of the first portion, without the second portion of the natural language response being rendered therebetween.

15. A method implemented using one or more processors, the method comprising:
receiving a user query that includes natural language, the user query being generated based on user interface input at a client device;
in response to receiving the user query:
generating a natural language response that is responsive to the user query;
causing at least a first portion of the natural language response to be rendered at the client device responsive to the query;
generating a text prompt that includes the user query, the first portion of the natural language response, and a natural language request to generate a refined response that is responsive to the user query and that is to follow the first portion of the natural language response;
while the first portion of the natural language response is being rendered:
causing the generated text prompt to be processed using a generative model, resulting in a refined natural language response that includes a refined portion that is to follow the first portion; and
causing the refined portion of the refined natural language response to be rendered succeeding rendering of the first portion of the natural language response.

16. The method of claim 15, wherein the natural language response is generated using an additional generative model, and wherein the generative model includes a higher quantity of parameters than the additional generative model.

17. The method of claim 16, wherein the additional generative model is trained or fine-tuned to avoid making a factual statement.

18. The method of claim 15, wherein the natural language response is generated using a template with one or more fields of the template filled with information from the user query.

19. The method of claim 15, wherein the first portion of the natural language response includes an inaccurate factual statement, and the refined portion of the refined natural language response includes a sentence that corrects or revises the inaccurate factual statement.

20. A method implemented using one or more processors, the method comprising:
receiving a user query that includes natural language, the user query being generated based on user interface input at a client device;
in response to receiving the user query,
generating a natural language response that is responsive to the user query;
causing at least a first portion of the natural language response to be rendered via client device;
while the first portion of the natural language response is being rendered via the client device:
generating a prompt that includes the user query, the first portion of the natural language response, and a natural language request to generate a refined response that is responsive to the user query and that is to follow the first portion of the natural language response, and
causing the generated prompt to be processed using a generative model, resulting in a refined natural language response that includes a refined portion to succeed the first portion;
determining that the refined portion of the refined natural language response is not received when rendering of the first portion is complete; and
in response to determining that the refined portion of the refined natural language response is not received when rendering of the first portion is complete,
causing a sentence in a second portion of the natural language response that succeeds the first portion to be rendered, and
causing the refined portion of the refined natural language response to be rendered succeeding the sentence in the second portion.

21. The method of claim 20, wherein the first portion of the natural language response includes no factual statement, and the second portion of the natural language response includes at least a factual statement for one or more entities of the user query.

* * * * *